(12) United States Patent
Tian

(10) Patent No.: US 8,732,319 B2
(45) Date of Patent: May 20, 2014

(54) CONTEXT AWARENESS PROXIMITY-BASED ESTABLISHMENT OF WIRELESS COMMUNICATION CONNECTION

(75) Inventor: Dan Tian, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 221 days.

(21) Appl. No.: 13/157,941

(22) Filed: Jun. 10, 2011

(65) Prior Publication Data

US 2012/0317194 A1    Dec. 13, 2012

(51) Int. Cl.
| | | |
|---|---|---|
| *G06F 15/16* | (2006.01) | |
| *H04L 29/06* | (2006.01) | |
| *H04L 29/08* | (2006.01) | |
| *G06Q 10/10* | (2012.01) | |

(52) U.S. Cl.
CPC ........... *H04L 29/06* (2013.01); *H04L 29/08072* (2013.01); *H04L 29/08576* (2013.01); *G06Q 10/10* (2013.01)
USPC ............ 709/228; 709/204; 709/217; 709/225

(58) Field of Classification Search
USPC ....................................................... 709/204
See application file for complete search history.

(56) References Cited

U.S. PATENT DOCUMENTS

| | | | |
|---|---|---|---|
| 8,266,027 B2* | 9/2012 | Moritz et al. .................... | 705/35 |
| 8,316,438 B1* | 11/2012 | Bush et al. ...................... | 726/22 |
| 2003/0220765 A1 | 11/2003 | Overy et al. | |
| 2004/0068744 A1 | 4/2004 | Claussen et al. | |
| 2004/0203365 A1 | 10/2004 | Yamamoto et al. | |
| 2006/0056636 A1 | 3/2006 | Schrum | |
| 2006/0094402 A1 | 5/2006 | Kim | |
| 2006/0187865 A1 | 8/2006 | Sakai | |
| 2007/0242729 A1 | 10/2007 | Quinn et al. | |
| 2007/0249288 A1 | 10/2007 | Moallemi et al. | |
| 2008/0013601 A1 | 1/2008 | Lind et al. | |
| 2008/0106372 A1* | 5/2008 | Chang ............................ | 340/5.8 |
| 2008/0171559 A1 | 7/2008 | Frank et al. | |
| 2008/0184345 A1 | 7/2008 | Kaechi | |

(Continued)

FOREIGN PATENT DOCUMENTS

| | | |
|---|---|---|
| CN | 1422008 | 6/2003 |
| WO | 2013131029 | 9/2013 |

OTHER PUBLICATIONS

U.S. Appl. No. 12/943,556, filed Nov. 10, 2010, Tian, Dan.

(Continued)

*Primary Examiner* — Tauqir Hussain
(74) *Attorney, Agent, or Firm* — DeLizio Gilliam, PLLC

(57) ABSTRACT

A mechanism for context awareness proximity-based establishment of wireless communication connections can be implemented in Bluetooth-compatible devices for simplifying procedures for device discovery, connection, service discovery, and content exchange. In response to determining to execute a context task associated with an application associated with a first communication device, the first communication device can determine whether a second communication device is within a threshold detection distance from the first communication device. If the second communication device is within the threshold detection distance from the first communication device, the first communication device can establish a communication link with the second communication device based, at least in part, on one or more connection parameters associated with the second communication device. The first communication device can determine whether to execute the context task based, at least in part, on a service list associated with the second communication device and the context task.

25 Claims, 10 Drawing Sheets

(56) References Cited

U.S. PATENT DOCUMENTS

| | | | | |
|---|---|---|---|---|
| 2010/0015919 | A1* | 1/2010 | Tian | 455/41.2 |
| 2010/0081385 | A1* | 4/2010 | Lin et al. | 455/41.3 |
| 2010/0082784 | A1 | 4/2010 | Rosenblatt et al. | |
| 2010/0130131 | A1 | 5/2010 | Ha et al. | |
| 2010/0181373 | A1* | 7/2010 | Murakami et al. | 235/375 |
| 2010/0274859 | A1 | 10/2010 | Bucuk | |
| 2010/0306394 | A1* | 12/2010 | Brown et al. | 709/229 |
| 2010/0318712 | A1* | 12/2010 | Boldyrev et al. | 710/308 |
| 2011/0092155 | A1 | 4/2011 | Piemonte et al. | |
| 2011/0314153 | A1* | 12/2011 | Bathiche et al. | 709/225 |
| 2012/0042087 | A1* | 2/2012 | Berg et al. | 709/229 |
| 2012/0271908 | A1* | 10/2012 | Luna et al. | 709/216 |
| 2013/0204998 | A1* | 8/2013 | Russell et al. | 709/223 |
| 2013/0229930 | A1 | 9/2013 | Akay et al. | |

OTHER PUBLICATIONS

Balaban, Dan "New Apple NFC Patent Gives the iPhone a Key Role in Device Sharing", *Forthwrite Media SARL and NFC Times* http://www.nfctimes.com/news/new-apple-nfc-patent-casts-iphone-role-device-sharing-hub Obtained from the internet May 6, 2011. Apr. 6, 2010, 6 pages.

Clark, Sarah "Stanford researchers develop first Android NFC P2P apps", *Near Field Communications World* http://www.nearfieldcommunicationsworld.com/2011/01/31/35785/stanford-researchers-develop-first-android-nfc-p2p-apps/ Obtained from Internet on May 6, 2011 Jan. 31, 2011, 3 pages.

"PCT Application No. PCT/US11/46906 International Search Report", Dec. 15, 2011, 13 pages.

International Search Report and Written Opinion—PCT/US2011/046906—ISA/EPO—Dec. 15, 2011.

U.S. Appl. No. 12/943,556 Office Action, Sep. 25, 2012, 17 pages.

"U.S. Appl. No. 12/943,556 Final Office Action", Feb. 25, 2013, 23 Pages.

"PCT Application No. PCT/US2013/028713 International Search Report", Aug. 30, 2013, 12 pages.

"U.S. Appl. No. 13/411,139 Office Action", Nov. 8, 2013, 15 pages.

* cited by examiner

CONTEXT AWARENESS PROXIMITY-BASED ESTABLISHMENT OF WIRELESS COMMUNICATION CONNECTION

BACKGROUND

Embodiments of the inventive subject matter generally relate to the field of wireless communication and, more particularly, to a context awareness proximity based mechanism for establishment of wireless communication connection.

Wireless communication technologies (e.g., Bluetooth® wireless communication standard, wireless local area network (WLAN) communication standard, etc.) are typically employed for exchanging communications between two or more communication devices. For example, the Bluetooth wireless communication standard can be employed for exchanging communications between fixed or mobile Bluetooth-enabled devices over short distances. When a destination communication device is within range of an initiating communication device, the initiating communication device can authenticate and validate the destination communication device. Accordingly, a communication link for exchanging communications can then be established between the initiating and the destination communication devices.

SUMMARY

Various embodiments of a context awareness proximity based mechanism for establishment of wireless communication connection are disclosed. In one embodiment, it is determined, at a first communication device, to execute a context task associated with an application associated with the first communication device. It is determined whether a second communication device is within a threshold detection distance from the first communication device in response to determining to execute the context task associated with the application associated with the first communication device. In response to determining that the second communication device is within the threshold detection distance from the first communication device, a communication link is established with the second communication device based, at least in part, on one or more connection parameters associated with the second communication device. It is determined whether to execute the context task associated with the first communication device based, at least in part, on a service list associated with the second communication device and the context task. The context task is executed via the communication link between the first communication device and the second communication device in response to determining to execute the context task associated with the first communication device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
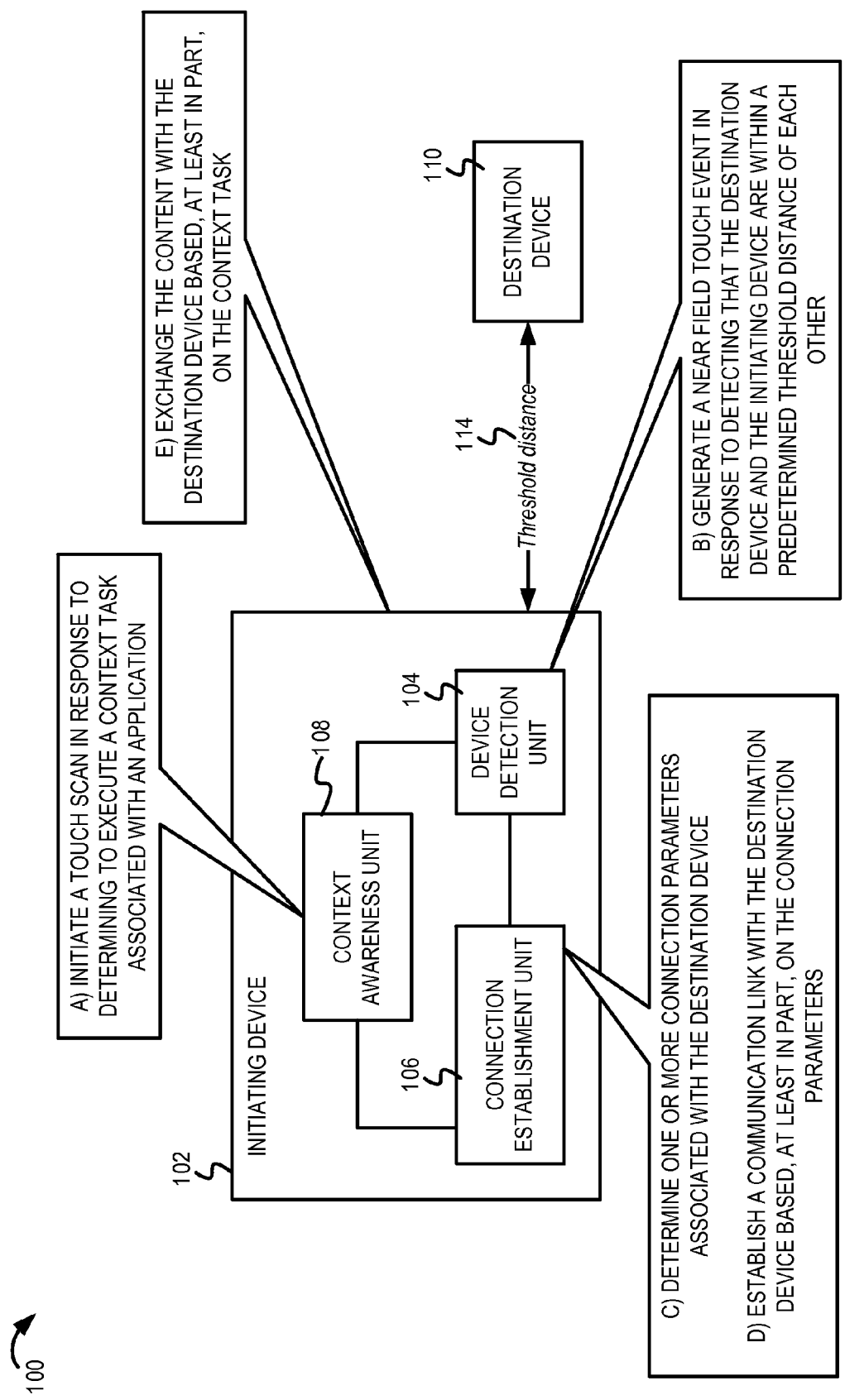
FIG. 1 is an example conceptual diagram illustrating a context awareness proximity-based mechanism for establishing a communication link between wireless communication devices.

The description that follows includes exemplary systems, methods, techniques, instruction sequences, and computer program products that embody techniques of the present inventive subject matter. However, it is understood that the described embodiments may be practiced without these specific details. For instance, although examples refer to establishing a wireless communication connection based on proximity between devices with Bluetooth capabilities ("Bluetooth devices"), embodiments are not so limited. In other embodiments, techniques for proximity-based establishment of wireless communication connections can be extended to other communication devices and standards (e.g., wireless local area networks (WLAN), WiMAX, Wireless USB devices, etc.) or combinations of devices (e.g., WLAN and Bluetooth). In other instances, well-known instruction instances, protocols, structures, and techniques have not been shown in detail in order not to obfuscate the description.

The Bluetooth communication protocol comprises various procedures such as device discovery procedures, device pairing procedures, connection and service discovery procedures, etc. for establishing a Bluetooth communication link between Bluetooth devices. Specifically, the Bluetooth communication protocol typically requires a user to initiate the device discovery procedures, device pairing procedures, and connection and service discovery procedures to establish the Bluetooth communication link between two Bluetooth devices. It may be difficult and complicated, from the user's standpoint, to determine how to initiate discovery, pairing, and connection procedures, locate hidden icon/menu options, and accordingly set up the Bluetooth communication link.

In some embodiments, Bluetooth devices can be configured to implement a mechanism for automatically establishing a Bluetooth communication link based, at least in part, on proximity of the Bluetooth devices. In one embodiment, one of the Bluetooth devices (e.g., an initiating Bluetooth device) can use near field detection mechanisms to determine when the other Bluetooth device (e.g., the destination Bluetooth device) is within a threshold distance of the initiating Bluetooth device ("near field touch" or "proximity-based touch"). Furthermore, a user's task context and physical operation on an application can be detected and the user's intention with respect to the application (referred to herein as "context task") can be predicted. The context task in conjunction with the near field touch can be used to establish a Bluetooth communication link between the initiating Bluetooth device and the destination Bluetooth device and to execute the context task. Such an automated mechanism for establishing a Bluetooth communication link between the Bluetooth devices based, at least in part, on the context task and the near field touch can simplify the process for users to initiate discovery, pairing, and connection procedures compared to complicated menu options, can simplify and speed up operations for establishing the Bluetooth communication link, may significantly reduce or eliminate configuration steps, and can reduce inconvenience to the users. For example, from a user's standpoint, to upload photos from a camera onto a laptop, the user may place the camera within the threshold distance of the laptop. The laptop may automatically (or on user command) download the pictures from the camera.

FIG. 1 is an example conceptual diagram illustrating a context awareness proximity-based mechanism for establishing a communication link between wireless communication devices. FIG. 1 depicts communication devices 102 and 110. The communication device 102 comprises a device detection unit 104, a connection establishment unit 106, and a context awareness unit 108. In FIG. 1, the communication device 102 may be referred to as the initiating device that initiates communication/connection (e.g., initiates a touch scan procedure) with another communication device (referred to as the destination device). In the example shown in FIG. 1, the communication device 110 can be the destination device with which the initiating device 102 detects a near field touch (or proximity-based touch) and subsequently establishes a communication link. In one embodiment, the initiating device 102 and the destination device 110 may be Bluetooth devices. In another embodiment, the initiating device 102 and the destination device 110 may be electronic devices that comprise one or more communication units (e.g., a Bluetooth communication unit, a WLAN communication unit, etc.). In some implementations, the initiating device 102 and the destination device 110 can each be a personal computer (PC), a laptop, a mobile phone, a netbook, a tablet computer, a gaming console, a Bluetooth car kit, television set-top box, a home media center, an access point, Bluetooth peripheral devices (e.g., Bluetooth headset, Bluetooth mouse), or other suitable electronic device. It is noted that, although not depicted in FIG. 1, the communication unit 110 may also comprise a device detection unit, a connection establishment unit, and a context awareness unit. As will be further described in stages A-E, the initiating device 102 can execute functionality to detect a near field touch based on the proximity of the destination device 110 and to establish a communication link with the destination device 110.

At stage A, the context awareness unit 108 initiates touch scan procedures in response to determining to execute a context task associated with an application. In some implementations, the context awareness unit 108 can capture the context of a task or the application currently being executed on the initiating device 102 ("context task"). The context awareness unit 108 can prompt the device detection unit 104 to initiate the touch scan procedures in response to identifying the context task. In one implementation, launching an application (or executing a task) on the initiating device 102 can trigger detection of the context task and consequently the touch scan procedures. For example, the context awareness unit 108 may determine that a picture viewing application has been launched on the initiating device 102, and that a picture has been opened and is being displayed to the user. Accordingly, the context awareness unit 108 may determine that transferring pictures to another device (e.g., destination device 110) constitutes the context task associated with the initiating device 102. The context awareness unit 108 may then prompt the device detection unit 104 to initiate the touch scan procedure and to identify the destination device 110 within the threshold distance of the initiating device 102. As another example, a voice over internet protocol (VOIP) application on the initiating device 102 may detect a VOIP call and may determine to switch the VOIP call to a Bluetooth headset for hands-free operation. The context awareness unit 108 may identify the operation of connecting to the Bluetooth headset as a context task and may accordingly cause the touch scan procedures to be initiated. In another implementation, the context awareness unit 108 can periodically initiate the touch scan procedures to identify the destination device 110 that comprises data/services that may be utilized by the initiating device 102. In one implementation, as part of the touch scan procedures, the context awareness unit 108 can transmit a start touch scan request triggering the device detection unit 104 to scan for Bluetooth devices in the vicinity of the initiating Bluetooth device 102. The start touch scan request can comprise one or more context task parameters including an indicator of whether/when to start scanning for the destination device 110, an identifier associated with the application, an identifier associated with the context task, and other such parameters that describe the context task.

At stage B, the device detection unit 104 generates a near field touch event in response to detecting that the destination device 110 and the initiating device 102 are within a predetermined threshold distance 114 of each other. In some implementations, in response to receiving the start touch scan request, the device detection unit 104 can scan one or more Bluetooth communication channels to detect other Bluetooth devices that are proximate to the initiating Bluetooth device 102. With reference to the above example where a laptop computer that receives the VOIP call initiates the touch scan procedure, a user can move the Bluetooth headset towards the computer. The device detection unit 104 of the computer can detect a "near field touch" between the computer and the Bluetooth headset when the Bluetooth headset is within the pre-determined distance 114 of the computer, or when the Bluetooth headset physically touches the computer. As will be further described below in FIG. 3, in one example, the device detection unit 104 can employ near field communication (NFC) techniques to detect the near field touch between the computer and the Bluetooth headset. Accordingly, the device detection unit 104 can generate an indication of the detected near field touch ("near field touch event") that identifies the destination device 110. The device detection unit 104 can provide the near field touch event to the connection establishment unit 106. In one implementation, as will be described below in FIGS. 3-4, the near field touch event can comprise one or more touch parameters used for establishing the Bluetooth communication link with the destination device 110. In some implementations, only the initiating device 102 may comprise capabilities for detecting other communication devices within the threshold distance. In other implementations, the destination device 110 may also comprise capabilities for detecting other communication devices within the threshold distance. Furthermore, in some implementations, the corresponding device detection unit of the destination device 110 may also generate and provide the near field touch event including the touch parameters to the connection establishment unit of the destination unit 110. In other implementations, however, the destination device 110 may not generate the near field touch event.

At stage C, the connection establishment unit 106 determines one or more connection parameters associated with the destination device 110. The connection parameters can comprise an indication of communication protocols supported by the destination device 110, one or more radio units (or communication units) associated with the destination device 110, an ON/OFF status associated with the radio units, an address associated with the destination device 110, etc. For example, the connection parameters may indicate that the destination device 110 supports the Bluetooth protocol and the WLAN protocol. The connection parameters may also indicate that the Bluetooth radio unit is enabled while the WLAN radio unit is disabled.

At stage D, the connection establishment unit 106 establishes a communication link with the destination device 110 based, at least in part, on the connection parameters. The initiating device 102 and the destination device 110 can exchange a series of connection messages to establish one or more communication links based on the connection parameters and/or on the touch parameters. In some implementations, after the communication link is established, the connection establishment unit 106 can transmit a touch request message to indicate (e.g., to the destination device 110) that the communication link was established. The destination device 110 can, in turn, transmit a touch confirm message to acknowledge receipt of the touch request message. In some implementations, as will be further described in FIG. 3, the initiating device 102 and the destination device 110 can also exchange touch-exchange messages to identify one or more context tasks that are to be executed. In some implementations, the initiating device 102 and the destination device 110 may also exchange touch negotiate messages to negotiate the priority associated with multiple context tasks (if available) and to determine the order in which each of the multiple context tasks will be executed, as will be further described below.

At stage E, the initiating device 102 executes the context task. In one implementation, as will be further described below in FIGS. 3-9, after the connection establishment unit 106 establishes the communication link between the initiating device 102 and the destination device 110, the context awareness unit 108 can receive a list of services and protocols ("service list") supported by the destination device 110. Based, at least in part, on the service list associated with the destination device 110 and the context task, the context awareness unit 108 can determine whether the destination device 110 supports the services and protocols the initiating device 102 will use to execute the context task. If so, the context awareness unit 108 can cause the application to execute the context task (e.g., transmit the picture to the destination device 110).

It is noted that the operations described in FIG. 1 are examples. In other implementations, destination device 110 can analyze the service list associated with the initiating device 102 and can determine whether to execute a context task. For example, the initiating device 102 can receive services/data (e.g., receive content from a smart poster, connect to a Bluetooth headset, etc.) if the destination device 110 determines that the initiating device 102 supports the services and protocols that may be utilized (e.g., by the destination device 110) for executing the context task. This and other variations of the near field touch based connection establishment procedures will be further described in FIGS. 3-9.

Figure 2:
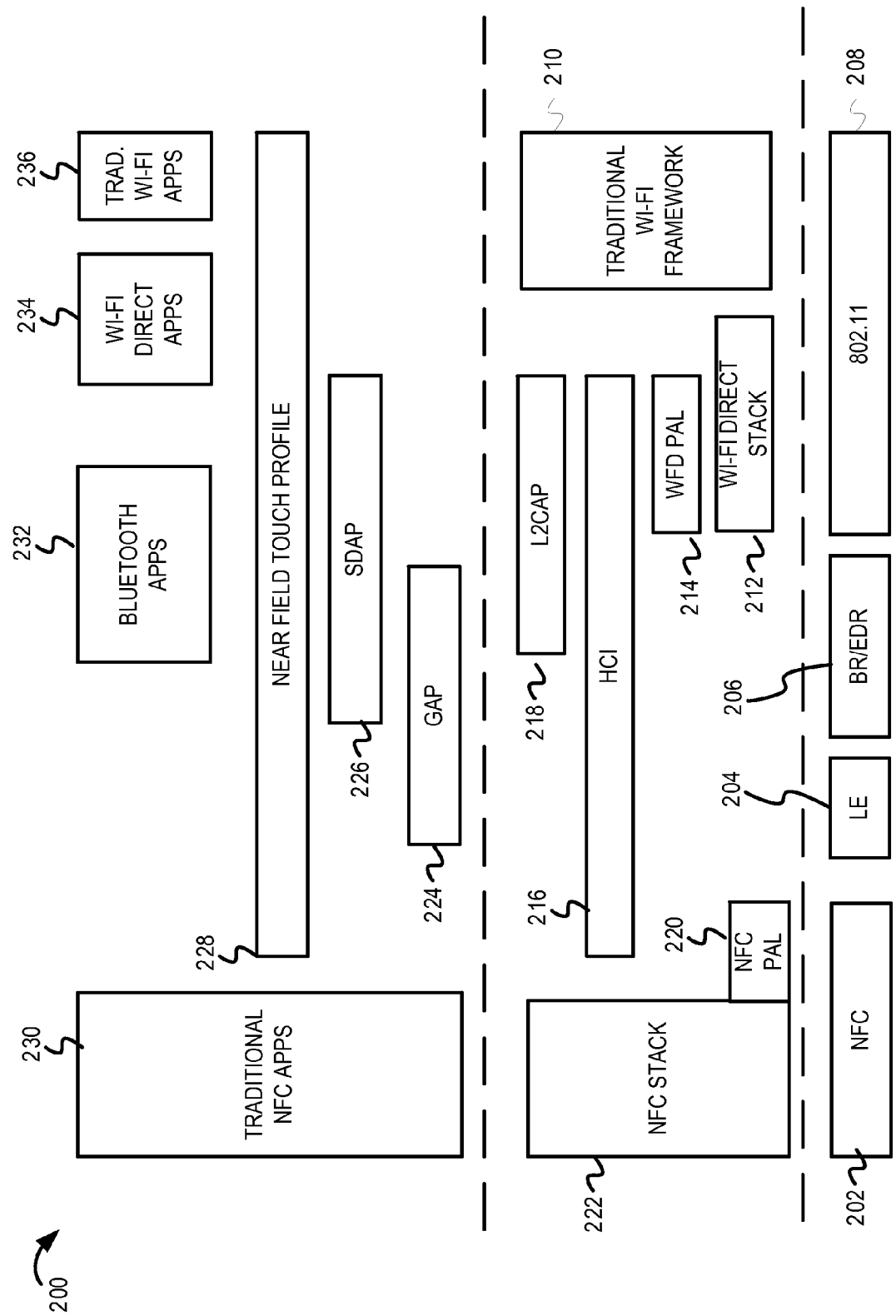
FIG. 2 is a conceptual diagram illustrating one embodiment of the network protocol architecture of a communication device comprising a Bluetooth and a WLAN radio unit.

FIG. 2 is a conceptual diagram illustrating one embodiment of the network protocol architecture 200 of a communication device comprising a Bluetooth and a WLAN radio. In the example of FIG. 2, the communication device employs near field communication (NFC) to detect and establish a communication link with another communication device. The network protocol architecture 200 comprises a physical layer including an NFC interface 202, a low energy (LE) Bluetooth interface 204, a basic rate/enhanced data rate (BR/EDR) Bluetooth interface 206, and an 802.11 (e.g., WLAN) interface 208. The network protocol architecture 200 includes an NFC stack 222 that operates across the NFC interface 202 and traditional NFC applications 230 that operate across the NFC stack 222. The network protocol architecture 200 also comprises a Wi-Fi Direct stack 212 and traditional Wi-Fi framework 210 that operate across the 802.11 interface 208. In some implementations, as depicted in FIG. 2, the network protocol architecture 200 can comprise a near field communication protocol adaptation layer (NFC PAL) 220. The NFC PAL 220 can abstract the implementation of the NFC stack 222 and can define a standard interface to access the NFC chipset in the Bluetooth host controller interface (HCI) 216. In other implementations, the network protocol architecture 200 may not comprise the NFC PAL 220. Instead, the functionality of the NFC PAL 220 may be integrated into the NFC stack 222.

In some implementations, the network protocol architecture 200 can comprise a Wi-Fi Direct PAL (WFD PAL) 214 that operates across the Wi-Fi Direct stack 212. The WFD PAL 214 can comprise the 802.11 PAL that defines the standard interface for the Bluetooth stack (including the HCI 216 and the L2CAP 218) to access 802.11 interface 208. The WFD PAL 214 can also comprise functionality to extend the 802.11 PAL to support direct device discovery and connection setup via the Wi-Fi Direct stack 212. The network protocol architecture 200 can also comprise the HCI 216 and the logical link control and adaptation protocol (L2CAP) 218 that operate across the WFD PAL 214, the BR/EDR interface 206, and the LE interface 204. In the upper protocol layers, the network protocol architecture 200 can comprise a generic access profile (GAP) 224 and a service discovery application profile (SDAP) 226 that operate across the L2CAP 218 and the HCI 216. In some implementations, functionality of the HCI 216 can be extended to enable triggering or halting operations to scan for NFC devices or NFC tags within the predetermined threshold distance, to enable reporting (e.g., to the upper protocol layers such as the applications) the setup and disconnection of the communication link with the destination device, to enable reading or writing data, etc. The HCI 216 can also be configured to provide notifications and data generated by the touch scan procedures to the near-field touch profile 228. The near field touch profile 228 can be configured to operate across the HCI 216, the GAP 224, and the SDAP 226. The near field touch profile 228 can be configured to collect near field touch events and to cause the connection establishment unit 106 to establish an appropriate communication link with the destination device 110. The near field touch profile 228 can be configured to coordinate the context task generated by an application (e.g., Bluetooth applications 232, Wi-Fi Direct applications 234, and/or traditional Wi-Fi applications 236 that operate across the near field touch profile 228) with the lower protocol layers to establish the appropriate communication link.

Although not depicted in FIG. 2, in some implementations, the communication device may only implement the Bluetooth communication protocol. With reference to FIG. 2, the communication device may not implement the WLAN communication protocol and the network protocol architecture 200 may not comprise the 802.11 interface 208, the Wi-Fi Direct stack 212, the WFD PAL 214, the traditional Wi-Fi framework 210, the Wi-Fi Direct applications 234, and the traditional Wi-Fi applications 236. Likewise, in some implementations, the communication device may only implement the WLAN communication protocol. Furthermore, although FIG. 2 depicts an NFC touch detection module comprising the NFC interface 202, the NFC stack 222, and the NFC PAL 220 to detect near field touch events, embodiments are not so limited. In other embodiments, the network protocol architecture 200 can comprise other suitable touch detection modules (e.g., an infrared (IR) touch detection module comprising an IR sensor, IR interface, an IR communication stack, etc., or other sensor mechanisms) configured to detect proximity between two communication devices.

Figure 3:
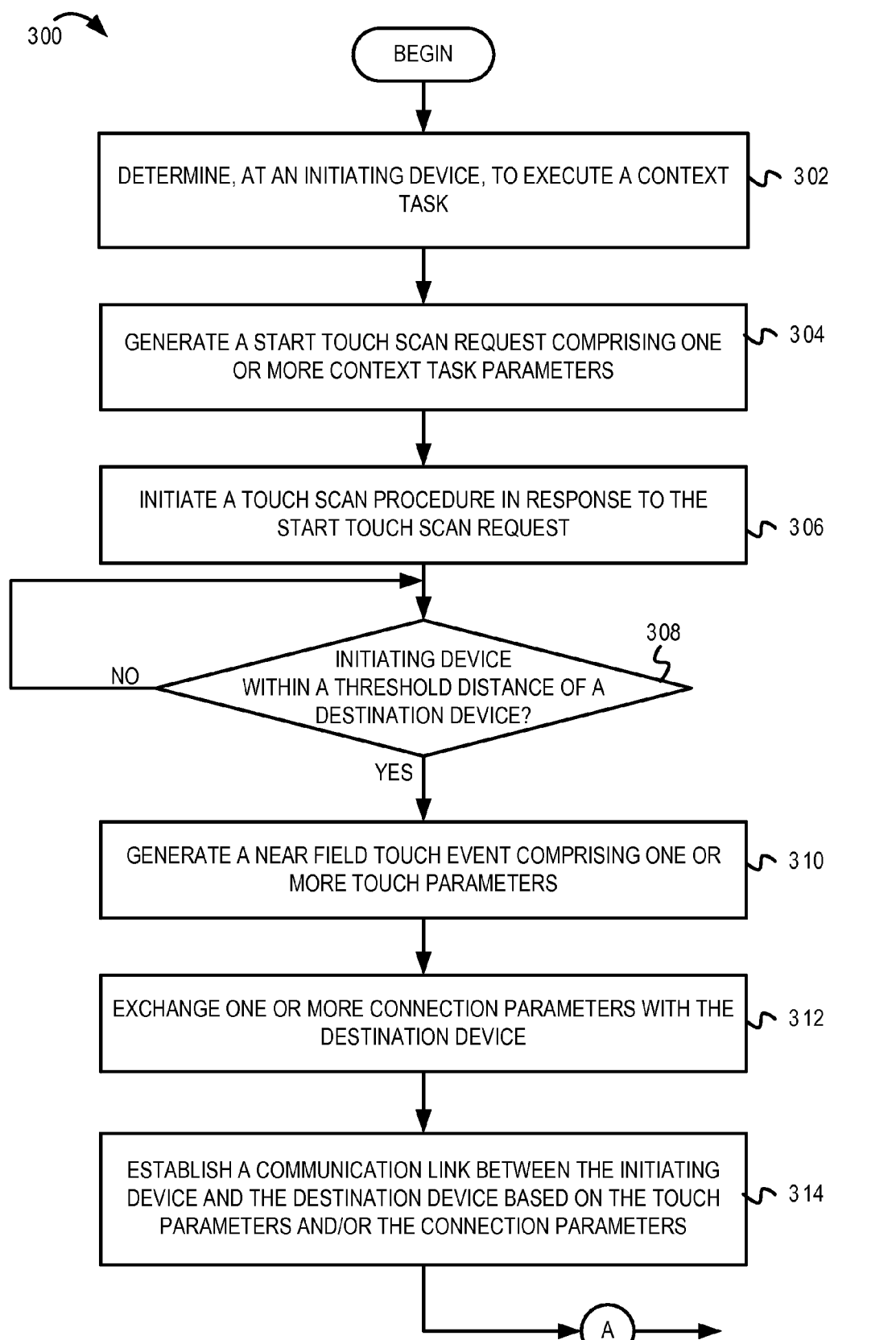
FIG. 3 is a flow diagram illustrating example operations of an initiating communication device establishing a communication link based on a context task and a near field touch.
Figure 4:
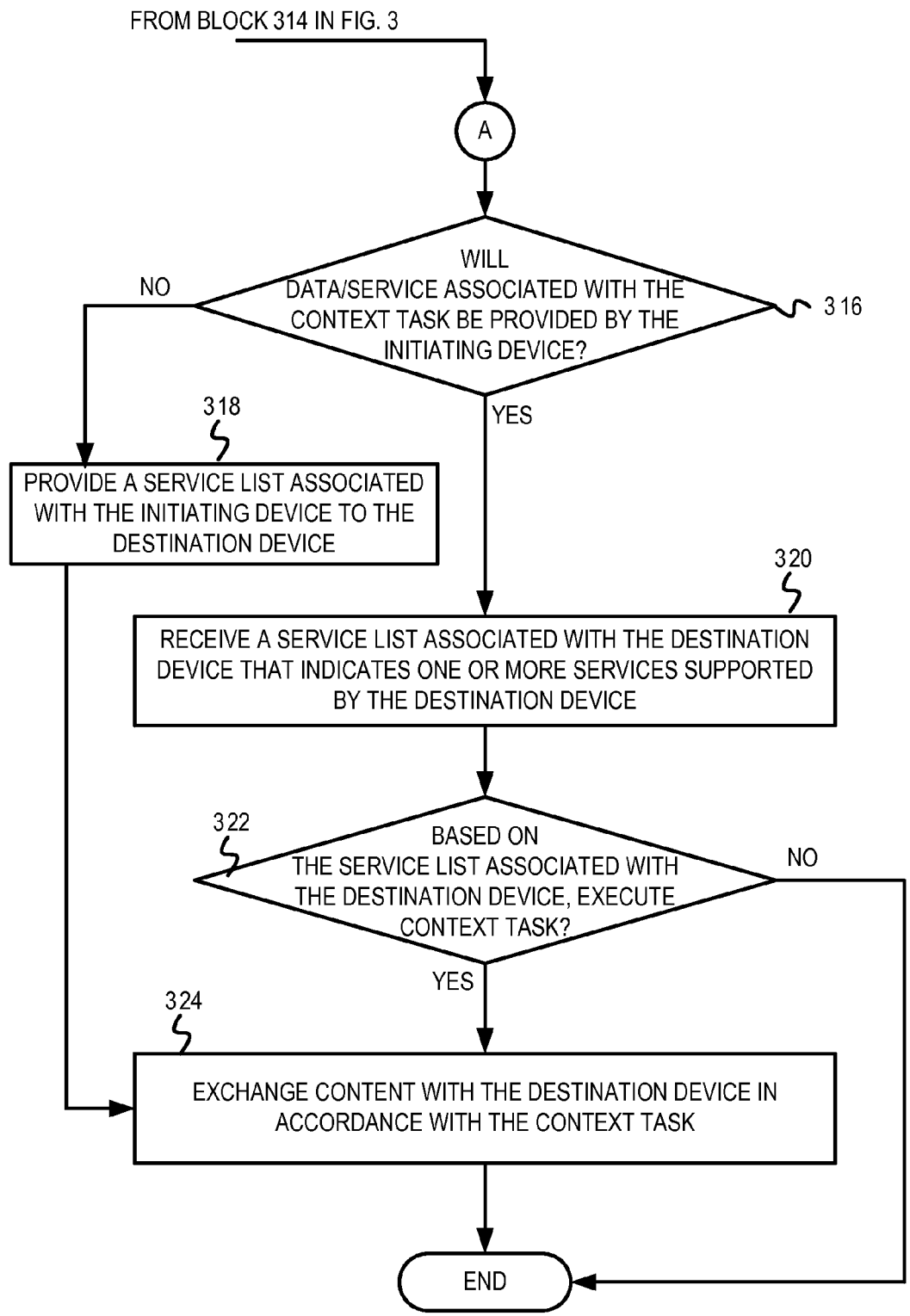
FIG. 4 is a continuation of FIG. 3 and also illustrates example operations of an initiating communication device establishing a communication link based on a context task and a near field touch.

FIG. 3 and FIG. 4 depict a flow diagram ("flow") 300 illustrating example operations of an initiating communication device establishing a communication link based on a context task and a near field touch. The flow 300 begins at block 302 in FIG. 3.

At block 302, an initiating device determines to execute a context task. With reference to the example of FIG. 1, the context awareness unit 108 of the initiating device 102 can determine to execute one or more operations (e.g., exchange content with another communication device, etc.) based on detecting a context task. As described above in FIG. 1, the context awareness unit 108 can capture the context of an application (or user-initiated task) currently being executed on the initiating device 102 to determine the operations that should be executed in relation to the application (i.e., to determine the context task). In one example, as will be described in FIG. 6, the user may launch a picture viewing application and may open a picture for display by the picture viewing application. The context awareness unit 108 can accordingly identify operations for transferring the picture to a destination device (e.g., the destination device 110 of FIG. 1) as the context task. The context awareness unit 108 can also determine that subsequent near field touch procedures and connection establishment procedures should be executed in the context of the picture viewing application and the picture transfer operations. In another example described below in FIG. 7, a laptop computer (e.g., the initiating device 102) may launch a VOIP application in response to receiving a VOIP call. Launching the VOIP application can trigger a context task for a hands free audio gateway service (e.g., to connect to a Bluetooth headset). The flow continues at block 304.

At block 304, a start touch scan request comprising one or more context task parameters is generated. In one implementation, the context awareness unit 108 can generate the start touch scan request in response to detecting a pending context task associated with an application. For example, the context awareness unit 108 can generate the start touch scan request in response to determining that a picture viewing application is displaying a picture that is to be transmitted. As another example, the context awareness unit 108 can generate the start touch scan request in response to detecting a VOIP call and determining to connect to a Bluetooth headset for hands-free operation. As another example, the context awareness unit 108 can generate the start touch scan request in response to determining that an application (e.g., a web browser on a mobile phone) is requesting data associated with a smart poster. In another implementation, the context awareness unit 108 can generate the start touch scan request at periodic intervals to identify the destination device 110 that comprises data/services for the initiating device 102. The start touch scan request can comprise a start scanning flag and/or an indicator of when to initiate the touch scan procedures (i.e., a time instant at which to begin scanning for the destination device 110). Additionally, the context task parameters can include an identifier of the application associated with the context task, an application task class identifier associated with the context task, and a preferred communication channel. The preferred communication channel can indicate the communication channel via which the application prefers to transfer content (e.g., to execute the context task). As will be described below, the connection establishment unit 106 can attempt to establish the communication link with the destination device 110 on the preferred communication channel. The context task parameters can also comprise an indication of the preferred communication protocol (e.g., Bluetooth communication protocol, WLAN communication protocol, etc.). The flow continues at block 306.

At block 306, a touch scan procedure is initiated in response to the start touch scan request. For example, the context awareness unit 108 can provide the start touch scan request to the device detection unit 104. In response to receiving the start touch scan request, the device detection unit 104 can initiate the touch scan procedure and can monitor one or more communication channels to detect a near field touch with the destination device 110. The flow continues at block 308.

At block 308, it is determined whether the initiating device is within a threshold distance of the destination device. For example, the device detection unit 104 can determine whether the initiating device 102 and the destination device 110 are within the threshold distance 114 of each other. In one implementation, the device detection unit 104 can comprise a near field communication (NFC) unit that uses NFC techniques to detect whether the destination device 110 is within the threshold distance of the initiating device 102. In another implementation, the device detection unit 104 can comprise one or more sensors that may be externally coupled with (or integrated with) the initiating device 102. For example, the device detection unit 104 can comprise a sensor that detects an approaching user (e.g., a user's hand) or device, a vibration detection sensor that detects vibrations associated with the destination device 110, a thermal imaging sensor, an IR sensor, or other suitable sensor for determining whether the destination device 110 is within the threshold distance of the initiating device 102. In another implementation, the device detection unit 104 can employ a combination of two or more of the aforementioned techniques (e.g., an IR sensor in conjunction with a vibration detection sensor) to determine whether the destination device 110 is within the threshold distance of the initiating device 102. In another implementation, the device detection unit 104 can employ other suitable techniques to determine whether the destination device 110 is within the threshold distance of the initiating device 102. Which of the detection techniques are employed for detecting the destination device 110 can depend on the implementation of the initiating device 102, one or more detection requirements including detection accuracy, detection sensitivity, response time, security, power consumed, etc. The threshold distance 114 between the initiating device 102 and the destination device 110 can be determined based on the detection technique(s) employed, sensors (if any) employed by the initiating device 102, detection requirements of the initiating device 102, and other such factors. For example, the threshold distance 114 may be 4cm if the device detection unit 104 uses NFC techniques to detect the destination device 110. If it is determined that the initiating device 102 and the destination device 110 are within the threshold distance 114 of each other, the device detection unit 104 determines that a near field touch between the initiating device 102 and the destination device 110 was detected. Consequently, the flow continues at block 310. Otherwise, the flow loops back to block 308 where the device detection unit 104 can continue scanning operations to determine whether the initiating device 102 and the destination device 110 are within the threshold distance 114 of each other.

At block 310, a near field touch event comprising one or more touch parameters is generated. In one implementation, the device detection unit 104 can generate the near field touch event in response to determining that initiating device 102 and the destination device 110 are within the threshold distance 114 of each other. In another implementation, the device detection unit 104 can generate the near field touch event in response to detecting physical contact between the initiating device 102 and the destination device 110. The near field touch event can comprise a flag that indicates whether the destination device 110 was within the threshold distance 114 of or in contact with the initiating device 102. The near field touch event can also comprise one or more other touch parameters (further described below) that can be used for subsequently establishing a communication link between the initiating device 102 and the destination device 110.

In one example, the touch parameters can comprise timing associated with the near field touch between the initiating device 102 and the destination device 110. In one implementation, the touch parameters can indicate whether a short touch (e.g., when the duration of the near field touch is less than a predetermined time period) or a long touch (e.g., when the duration of the near field touch is greater than the predetermined time period) was detected. For example, a WLAN access point may comprise configuration functionality and connection functionality. A user may touch a WLAN-capable phone to the WLAN access point. A short touch can indicate (e.g., to the WLAN access point) that the WLAN-enabled phone is requesting permission for connecting to the WLAN access point and the WLAN access point may accordingly execute the connection functionality. A long touch can indicate (e.g., to the WLAN access point) that the WLAN-enabled phone is requesting configuration parameters associated with the WLAN access point (e.g., for forwarding to another communication device).

Additionally, the touch parameters can comprise position and direction associated with the near field touch between the initiating device 102 and the destination device 110. In other words, the touch parameters can be used to indicate the position and direction of the destination device 110 relative to the initiating device 102. In some implementations, the device detection unit 104 can be implemented as a set of one or more NFC tags. The touch parameters can indicate the position of the destination device 110 relative to one or more NFC tags. For example, a computer can comprise NFC tags at each of its four corners. The touch parameters can identify an NFC tag (e.g., using a tag ID) or the position of the NFC tag (e.g., top-left corner tag) to which the destination device 110 was touched. In some implementations, each of the multiple NFC tags can be associated with different functionality. For example, touching the destination device 110 with a first NFC tag of the initiating device 110 can cause the initiating device 110 to execute synchronization operations. As another example, touching the destination device 110 to a second NFC tag of the initiating device 110 can cause the initiating device 110 to transmit a file to the destination device 110. In another implementation, any suitable sensors (e.g., pressure sensors, IR sensors, vibration sensors, etc.) can be employed instead of the NFC tags to detect the position and the direction of the destination device 110.

The touch parameters can also indicate a pattern associated with the near field touch between the initiating device 102 and the destination device 110. In one implementation, the user may touch the destination device 110 to the initiating device 102 only once to establish a communication link between the two devices. In other implementations, however, the user may touch the destination device 110 to the initiating device 102 according to a multi-touch pattern comprising a series of short and long touches, at one or more NFC tags, etc. For example, if the initiating device 102 comprises two NFC tags, the touch pattern can comprise a short touch with the first NFC tag, a short touch with the second NFC tag, and a long touch with the first NFC tag. In some implementations, each touch pattern may also be associated with different functionality. The device detection unit 104 can detect each of the short and long touches, the NFC tags that were touched, etc., and can identify the corresponding touch pattern. The device detection unit 104 can communicate an indication of the identified touch pattern to the connection establishment unit 106. It is noted that in other implementations, the near field touch event can indicate other suitable parameters that describe the near field touch between the initiating device 102 and the destination device 110. In some implementations, the device detection unit 104 may also indicate (e.g., to the connection establishment unit) the communication device at which the touch scan procedures were initiated. The flow continues at block 312.

At block 312, one or more connection parameters are exchanged with the destination device. In some implementations, the connection establishment unit 106 can receive the near field touch event including the touch parameters from the device detection unit 104. In some implementations, the connection establishment unit 106 can request and actively receive the connection parameters associated with the destination device 110. In another implementation, the connection establishment unit 106 can passively receive the connection parameters associated with the destination device 110. The connection parameters associated with the destination device 110 can include communication protocols supported by the destination device 110, radio units associated with the destination device 110, an ON/OFF status associated with the radio units, an address associated with the destination device 110 (e.g., Bluetooth address, 802.11 address, etc.). In some implementations, the connection establishment unit 106 can also determine the type of communication link that should be established based on knowledge of the context task that will be executed after the communication link is established. For example, the connection establishment unit 106 may determine that a Bluetooth headset was detected and that an incoming VOIP call is to be transferred to the Bluetooth headset. Accordingly, the connection establishment unit 106 can attempt to establish a hands-free profile (HFP) based communication link with the Bluetooth headset. The flow continues at block 314.

At block 314, a communication link is established between the initiating device and the destination device based on the touch event parameters and/or the connection parameters. In some implementations, the connection establishment unit 106 can determine the type of communication link that should be established with the destination device 110. The type of communication link can depend on the context task parameters (e.g., the application and/or task identifier determined at block 304), the touch parameters (e.g., the touch timing and/or pattern determined at block 310), and/or the connection parameters (e.g., protocols supported by the destination device determined at block 312). In one implementation, the connection establishment unit 106 can attempt to establish the communication link with the destination device 110 on the preferred communication channel and/or the preferred communication protocol (determined at block 304). For example, the connection establishment unit 106 may establish a Bluetooth communication link if the application associated with the context task preferred the Bluetooth communication protocol and if the Bluetooth radio unit associated with the destination device 110 is enabled. As another example, the connection establishment unit 106 can determine not to establish a Bluetooth communication link even if the application associated with the context task preferred the Bluetooth communication protocol if it is determined that the Bluetooth radio unit associated with the destination device 110 is disabled. Instead, if the preferred communication link (e.g., in this example, the Bluetooth communication link) cannot be established, the connection establishment unit 106 can establish an alternate communication link (e.g., a WLAN communication link). As another example, the application associated with the context task may indicate a preference for a high-speed Wi-Fi Direct communication channel. If the connection establishment unit 106 determines that the high data rate Wi-Fi Direct communication channel cannot be established (e.g., because the destination device 110 does not support high data rate communication or does not support the Wi-Fi Direct protocol), the connection establishment unit 106 can establish a lower BR/EDR communication channel.

In some implementations, the connection establishment unit 106 can exchange one or more touch control messages with the destination device 110 after the communication link is established. For example, the connection establishment unit 106 can transmit a touch request message to the destination device 110 to indicate that the communication link between the initiating device 102 and the destination device 110 has been established. The connection establishment unit 106 can receive a touch confirm message that acknowledges receipt of the touch request message at the destination device 110. The connection establishment unit 106 may transmit a touch exchange message to the destination device 110 to identify one or more context tasks that are to be executed. For example, the connection establishment unit 106 can transmit a touch exchange message to the destination device 110 to indicate that a picture will be transmitted to the destination device 110. As another example, the connection establishment unit 106 can transmit a touch exchange message to the destination device 110 to indicate that a VOIP call context task is pending and should be handled by the destination device 110. The connection establishment unit 106 can also exchange touch negotiate messages with the destination device 110 to negotiate the priority associated with multiple context tasks and to determine the order in which each of the multiple context tasks should be executed. After the communication link between the initiating device 102 and the destination device 110 is established, the flow continues at block 316 in FIG. 4.

At block 316, it is determined whether data/services associated with the context task are to be provided by the initiating device. For example, the context awareness unit 108 can determine whether the application on the initiating device 102 comprises data/services to be provided to the destination device 110 or whether the application on the initiating device 102 is requesting data/services that are provided by the destination device 110. For example, as will be described in FIG. 6, the context awareness unit 108 can determine that the picture viewing application on the initiating device 102 comprises data (e.g., a picture) to be transmitted to the destination device 110. In another example, as will be described in FIG. 7, the context awareness unit 108 can determine that the VOIP application on the initiating device 102 utilizes a hands-free communication service that is provided by the destination device 110 (e.g., a Bluetooth headset). In another example, as will be described in FIG. 8, the context awareness unit 108 can determine that an application on the initiating device 102 (e.g., a web browser on a mobile phone) is requesting data associated with a smart poster (e.g., the destination device 110). If it is determined that the data/services associated with the context task are to be provided by the initiating device 102, the flow continues at block 318. Otherwise, the flow continues at block 320.

At block 318, if the data/services associated with the context task are to be provided by the destination device, a service list associated with the initiating device is provided to the destination device. In response to determining that the initiating device 102 is requesting data/services from the destination device 110, the flow 300 moves from block 316 to block 318 where the context awareness unit 108 can provide the service list associated with the initiating device 112 to the destination device 110. For example, a mobile phone (i.e., the initiating device 102) may determine that a smart poster (i.e., the destination device 110) will provide data to the mobile phone. Accordingly, the context awareness unit 108 of the mobile phone can provide (e.g., automatically or in response to a service list request from the smart poster) the service list associated with the mobile phone. In another example, as will be described below in FIG. 5, the destination device 110 may or may not provide the service (e.g., hands-free communication service) to the initiating device 102 depending on the service list associated with the initiating device 102. The flow continues at block 324.

At block 320, if the data/services associated with the context task are to be provided by the initiating device, the initiating device receives a service list associated with the destination device that indicates one or more services supported by the destination device. The flow 300 moves from block 316 to block 320 in response to determining that the initiating device 102 will provide data/services to the destination device 110. In some implementations, the context awareness unit 108 can transmit a request for one or more services supported by the destination device 110. In response, the context awareness unit 108 can receive a service list from the destination device 110. For example, the context awareness unit 108 can request and receive the service list associated with the destination device 110 to determine whether the destination device 110 supports protocols and services (e.g., Object Push Profile) for receiving a picture from the initiating device 102. In some implementations, the context awareness unit 108 can employ SDAP procedures to discover the services and protocols supported by the destination device 110. The flow continues at block 322.

At block 322, it is determined whether the context task should be executed based, at least in part, on the service list associated with the destination device. The flow 300 moves from block 320 to block 322 in response to receiving the service list associated with the destination device 110. In one implementation, the context awareness unit 108 can determine whether the destination device 110 supports the services and protocols that may be utilized by the initiating device 102 for executing the context task based, at least in part, on the context task, the context task parameters, and/or the service list associated with the destination device 110. The context awareness unit 108 may determine one or more context task parameters (e.g., the application identifier, the application task identifier, etc.), access a data store (e.g., a task classification table), and determine services and protocols that may be utilized for executing the corresponding context task. The context awareness unit 108 may determine (e.g., based on the service list received from the destination device 110) whether the destination device 110 supports these services and protocols. In one example, as will be described in FIG. 6, the context awareness unit 108 may determine that the initiating device 102 will transmit the picture using object push profile procedures and can determine whether the destination device 110 supports the object push profile for receiving the picture at the destination device 110. As another example, as will be described in FIG. 9, the context awareness unit 108 may determine that the initiating computer 102 is attempting to establish a human interface device profile (HID) connection with the destination Bluetooth mouse and can determine whether the HID service is enabled at the destination Bluetooth mouse 110. If it is determined that the context task should be executed, the flow continues at block 324. Otherwise, if it is determined that the context task should not be executed, the flow ends.

At block 324, content is exchanged with the destination device in accordance with the context task. The flow 300 moves from block 322 to block 324 if it is determined that the context task should be executed. In some implementations, the context awareness unit 108 can determine what operations should be executed after the communication link is established between the initiating device 102 and the destination device 110 based on the touch parameters, the service list associated with the destination device 110, and/or the context task. Referring to the above example where the initiating device 102, comprising a picture viewing application, establishes a communication link with the destination device 110, the context awareness unit 108 can determine that the picture being viewed on the initiating device 102 should be transmitted to the destination device 110. In response to determining (at block 322) that the destination device 110 supports the protocols and services for receiving the picture, the context awareness unit 108 can trigger the application to execute the context task. With reference to the above example, the application can present a notification prompting the user to confirm whether the picture should be transmitted to the destination device 110. In response to receiving a confirmation from the user, the application can transmit the picture to the destination device 110 (e.g., using the object push profile). As another example, in response to determining that the HID service is enabled at the destination Bluetooth mouse 110, the context awareness unit 108 can trigger an HID handler associated with the initiating device 102 (e.g., a computer). The computer 102, in turn, can establish the HID connection with the destination Bluetooth mouse 110.

Additionally, the flow 300 also moves from block 318 to block 324 after the service list associated with the initiating device 102 is provided to the destination device 110. For example, as will be described in FIG. 7, the context awareness unit 108 may determine that a VOIP application on the initiating device 102 supports a hands-free communication service (e.g., the HFP service) and that a Bluetooth headset is registered to process context tasks associated with the HFP service. The context awareness unit 108 can advocate the context task (e.g., picking up the VOIP call) so that the Bluetooth headset can process the context task. The initiating device 102 (comprising the VOIP application) may establish a communication link with a destination Bluetooth headset 110 to request hands-free communication service provided by the destination Bluetooth headset 110. The destination Bluetooth headset 110 can complete the connection with the initiating device 102 based, at least in part, on determining that both the initiating device 102 and the destination device 110 support the HFP service. The destination Bluetooth headset 110 can pick up the VOIP call received at (or generated by) the VOIP application on the initiating device 102 and can provide the hands-free communication service using the HFP service. From block 324, the flow ends.

It is noted that although block 316 of FIG. 4 depicts the initiating device 102 determining whether it will provide the data/services associated with the context task, embodiments are not so limited. In other embodiments, the initiating device 102 may not execute the operations of block 316. Instead, the initiating device 102 can be configured to automatically transmit the service list (associated with the initiating device 102) to the destination device 102 or receive the service list (associated with the destination device 110) from the destination device 102. In other words, the flow 300 can automatically move from block 314 in FIG. 3 to block 318 or to block 320 depending on the configuration of the initiating device 102, the destination device 110, and/or the context task. Furthermore, although not explicitly described, it is noted that the connection procedure described in block 314 may comprise other operations, such as pairing operations (e.g., between Bluetooth devices) and authentication operations (e.g., between Bluetooth and/or WLAN devices).

Figure 5:
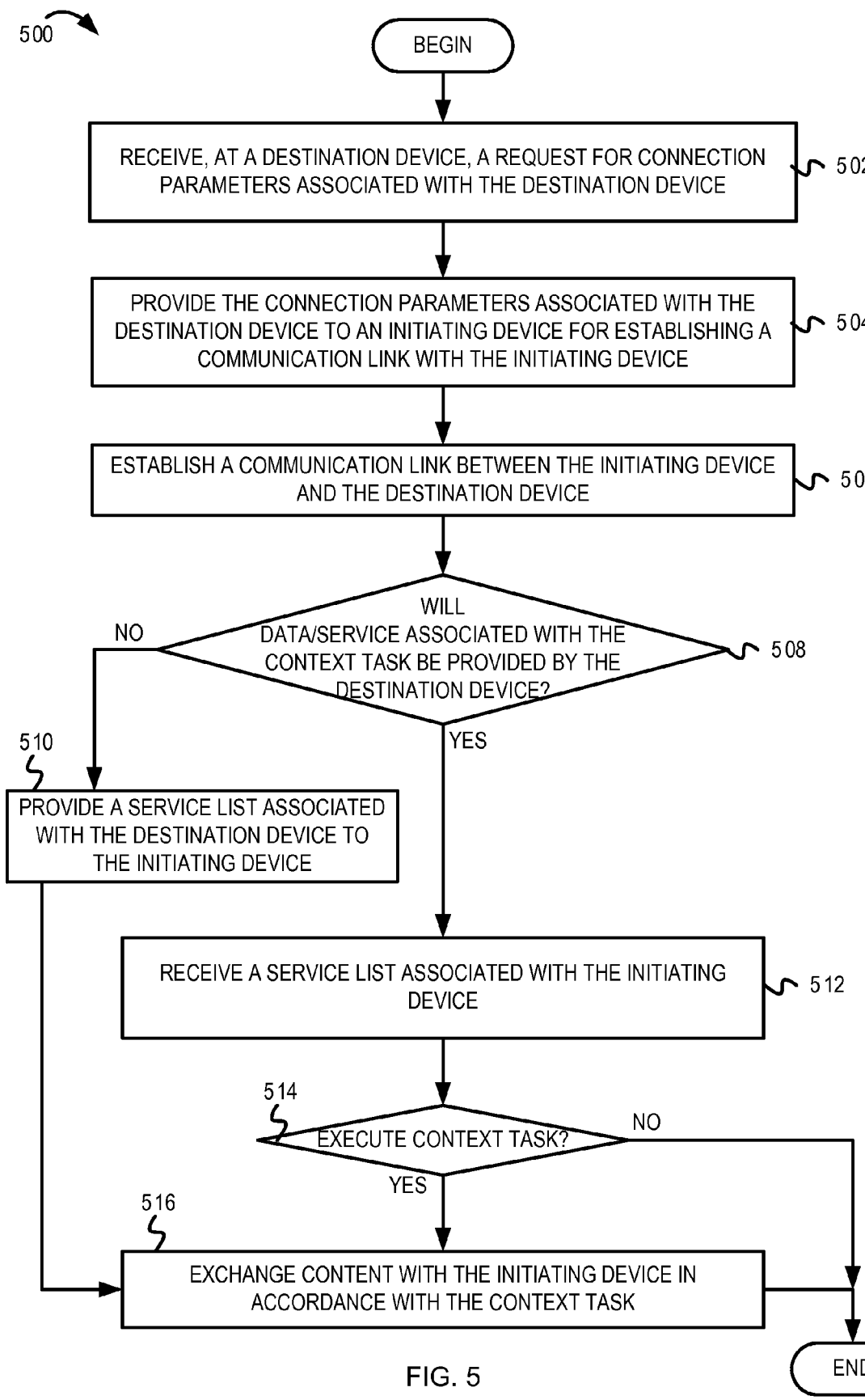
FIG. 5 is a flow diagram 500 illustrating example operations of a destination communication device establishing a communication link based on a context task and a near field touch.

FIG. 5 is a flow diagram 500 illustrating example operations of a destination communication device establishing a communication link based on a context task and a near field touch. The flow 500 begins at block 502.

At block 502, a destination device receives a request for connection parameters associated with the destination device. In one implementation, a connection establishment unit of the destination device 110 may receive (e.g., from an initiating device 102) the request for connection parameters associated with the destination device 110. In some implementations, the request for the connection parameters associated with the destination device 110 may be received in response to the initiating device 102 detecting that the destination device 110 is within a threshold distance of the initiating device 102. In other words, the initiating device 102 may send the request for the connection parameters to the destination device 110 in response to a near field touch being detected at the initiating device 102. The flow continues at block 504.

At block 504, the connection parameters associated with the destination device are provided to the initiating device to establish a communication link with the initiating device. In one implementation, if the destination device 110 is an active device (e.g., a mobile phone), the connection establishment unit can actively transmit the connection parameters associated with the destination device 110 to the initiating device 102. For example, a destination mobile phone may actively transmit its connection parameters. In another implementation, the destination device 110 may be a passive device (e.g., a device that does not require a source of energy for operation). In this example, an NFC tag (or sticker, key fob, card, or another passive component) associated with the destination device 110 (e.g., a smart poster) can passively provide the connection parameters (e.g., stored as part of the NFC tag) to the initiating device 102. For example, a destination smart poster can passively transmit (e.g., via the NFC tag) connection parameters associated with the smart poster. As described above in FIGS. 1 and 3, the connection parameters can comprise an identifier associated with the destination device 110, communication protocols supported by the destination device 110, etc. The flow continues at block 506.

At block 506, a communication link is established between the initiating device and the destination device. In some implementations, if the destination device is an active device, the connection establishment unit of the destination device 110 can exchange one or more connection messages with the initiating device 102 to establish the communication link between the initiating device 102 and the destination device 110. In other implementations, if the destination device 110 is a passive device, the initiating device 102 may automatically establish the communication link with the destination device 110. Additionally, as described above in FIG. 3, the destination device 110 may receive (e.g., from the initiating device 102) a touch request message that indicates that the communication link between the initiating device 102 and the destination device 110 has been established. The destination device 110 can acknowledge receipt of the touch request message by transmitting a touch confirm message. In some implementations, as described above, the destination device 110 may also exchange touch exchange messages and touch negotiate messages to identify one or more context tasks and to ascertain the order in which to process multiple context tasks respectively. The flow continues at block 508.

At block 508, it is determined whether data/services associated with the context task are to be provided by the destination device. In one implementation, as described above in FIG. 4, the context awareness unit of the destination device 110 can determine whether the destination device 110 comprises data/services to be provided to the initiating device 102 or whether the destination device 110 is requesting data/services from the initiating device 102. For example, it may be determined that a destination smart poster 110 comprises data to be transmitted to an initiating mobile phone 102. As another example, it can be determined that a destination mobile phone 110 is waiting to receive a picture from an initiating mobile phone 102. If it is determined that the data/services associated with the context task are to be provided by the destination device 110, the flow continues at block 512. Otherwise, the flow continues at block 510.

At block 510, if the data/services associated with the context task are to be provided by the initiating device, a service list associated with the destination device is provided to the initiating device. For example, in response to determining that the destination device 110 is requesting data/services from the initiating device 102, the context awareness unit of the destination device 110 can provide the service list associated with the destination device 110 to the initiating device 102. In some implementations, the service list associated with the destination device 110 can be provided in response to receiving a service list request from the initiating device 102. For example, a destination mobile phone 110 can provide its service list to an initiating mobile phone 102 (e.g., that comprises data to be transmitted to the destination mobile phone). As another example, a destination Bluetooth headset 110 may simply register to process one or more categories of context tasks (e.g., context tasks associated with the HFP service) and the context awareness unit 108 may accordingly determine the services supported by the destination Bluetooth headset 110. The flow continues at block 516.

At block 512, if the data/services associated with the context task are to be provided by the destination device, the destination device receives a service list associated with the initiating device. The flow 500 moves from block 508 to block 512 in response to determining that the destination device 110 will provide the data/services to the initiating device 102. In some implementations, the context awareness unit of the destination device 110 can request and receive the service list associated with the initiating device 102. In another implementation, the destination device 110 can automatically receive (e.g., without the destination device 110 specifically requesting) the service list associated with the initiating device 102. In another implementation, the destination device 110 can employ SDAP procedures to discover the services and protocols supported by the initiating device 102. For example, the destination smart poster 110 can receive a service list associated with the initiating mobile phone 102 (e.g., that requests data associated with the smart poster). The flow continues at block 514.

At block 514, it is determined whether the context task should be executed. The flow 500 moves from block 512 to block 514 in response to receiving the service list associated with the initiating device 102. At block 514, it may be determined whether the initiating device 102 supports the services and protocols that may be utilized by the destination device 110 for executing the context task. As described above in FIG. 4, the destination device 110 can determine whether the context task should be executed based, at least in part, on the context task, the context task parameters, and/or the service list associated with the initiating device 102. In one example, as will be described in FIG. 7, the destination Bluetooth headset 110 may determine that the initiating computer 102 supports the hands free profile audio gateway (HFP AG) profile that may be utilized by the destination Bluetooth headset 110 to execute the context task by establishing an HFP connection and providing hands-free communication. As another example, as will be described in FIG. 8, the destination smart poster 110 may determine that the initiating mobile phone 102 supports the appropriate profile that may be utilized by the destination smart poster 110 to execute the context task by transmitting data to the initiating mobile phone 102. If it is determined that the context task should be executed, flow continues at block 516. Otherwise, the flow ends.

At block 516, content is exchanged with the initiating device in accordance with the context task. The flow 500 moves from block 514 to block 516 if it is determined that the context task should be executed. As described above in FIG. 4, the destination device 110 can determine what operations should be executed after the communication link is established between the initiating device 102 and the destination device 110 based on the touch parameters, the service list associated with the initiating device 102, and/or the context task. For example, the context awareness unit associated with the destination smart poster 110 can cause the destination smart poster 110 to transmit data to the initiating mobile phone 102. As another example, the context awareness unit associated with the destination Bluetooth headset 110 can cause the destination Bluetooth headset 110 to establish an HFP connection with the initiating computer 102 and to pick up the VOIP call detected at the initiating computer 102. Additionally, the flow 500 also moves from block 510 to block 516 after the service list associated with the destination device 110 is provided to the initiating device 102. In this embodiment, the initiating device 102 can execute the context task at block 516. The destination device 110 can receive data from the initiating device 102 or can be connected to the initiating device 102 to receive a service from the initiating device 102. From block 516, the flow ends.

It is noted that the initiating device 102 and the destination device 110 can implement multiple content delivery models depending on the context task to be executed, whether the touch scan procedures are initiated by the initiating device 102 or the destination device 110, whether the context task will be executed by the initiating device 102 or the destination device 110, etc. FIGS. 6-9 illustrate four example delivery models for exchanging data (or services) between the initiating device 102 and the destination device 110. As will be described below, depending on the content delivery mode, the initiating device may or may not execute the context task.

Figure 6:
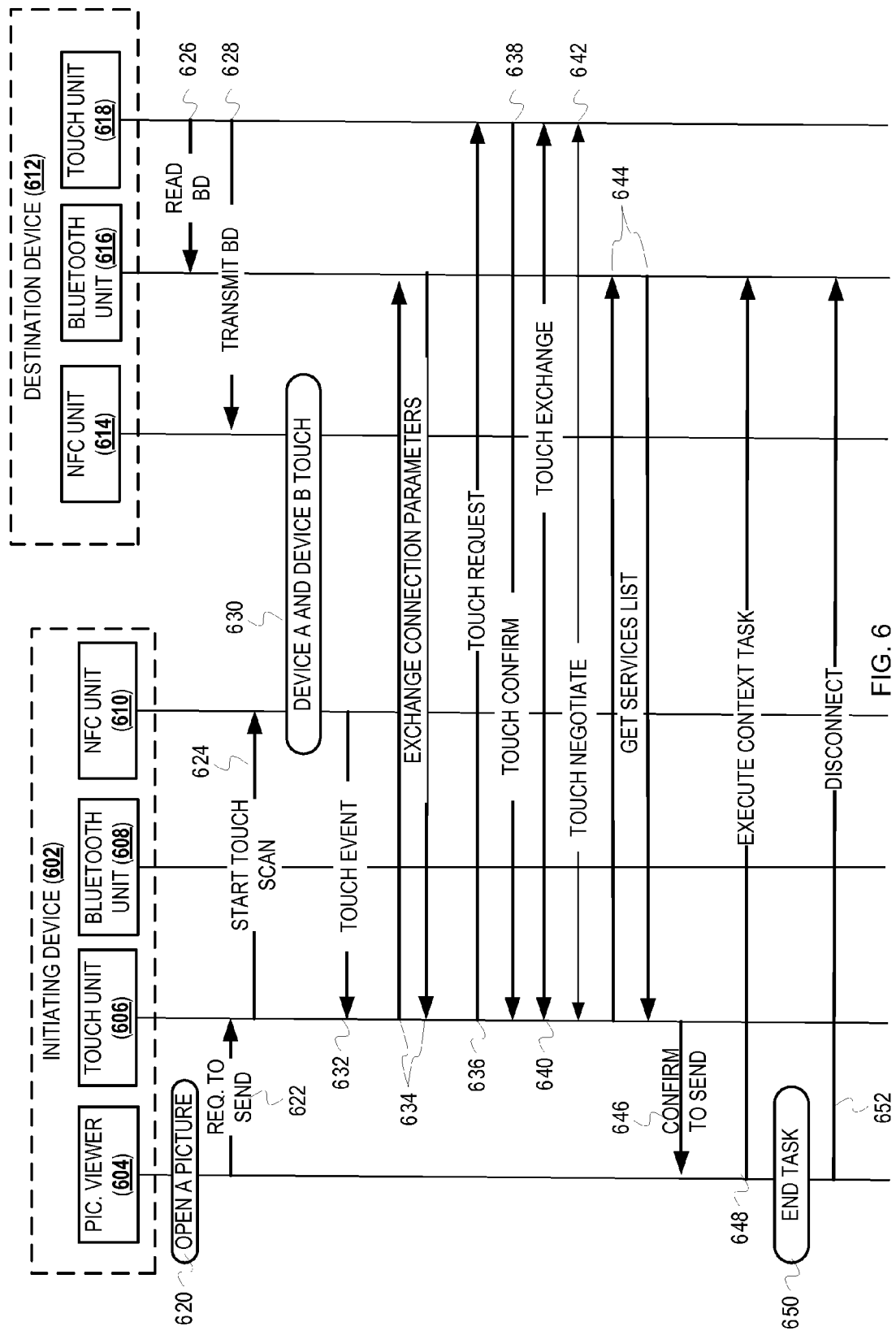
FIG. 6 is a sequence diagram illustrating example operations of an active data delivery mode associated with an initiating device that implements context awareness connection establishment.

FIG. 6 is a sequence diagram illustrating example operations of an active data delivery mode associated with an initiating device that implements context awareness connection establishment. FIG. 6 depicts an initiating device 602 and a destination device 612. The initiating device 602 comprises a picture viewer application 604, a touch unit 606, a Bluetooth unit 608, and an NFC unit 610. The destination device 612 comprises an NFC unit 614, a Bluetooth unit 616, and a touch unit 618. In one example, the initiating device 602 can be a Bluetooth-enabled mobile phone that can transmit a picture to the destination device 612 (e.g., another Bluetooth-enabled mobile phone) in response to a near field (or other proximity-based) touch. It is noted, however, that in other implementations, the operations described in FIG. 6 can be executed in response to other suitable applications determining to share its data with the destination device 612. In the active data delivery mode of FIG. 6, the picture viewer application 604 opens a picture at stage 620. The picture viewer application 604 determines to share the picture and transmits a request to send message 622 to the touch unit 606. The request to send message 622 can comprise an indication of data (e.g., the picture) to be transmitted and a request to establish a communication link for transmitting the data. The touch unit 606 can comprise functionality for executing near field touch procedures described herein, for establishing the communication link with the destination device 110, and facilitating execution of operations in accordance with a context task (i.e., transmitting the picture). The touch unit 606 can transmit a start touch scan request 624 prompting the NFC unit 610 to scan for the near field touch. As described above, the touch unit 606 can also determine an application identifier, an application task identifier, a preferred communication channel, a preferred communication protocol, and other such context task parameters. At the destination device 612, the touch unit 618 reads Bluetooth data (e.g., connection parameters) associated with the Bluetooth unit 616 of the destination device 612 at stage 626. Subsequently, at stage 628, the touch unit 618 initializes and transmits the Bluetooth data associated with the Bluetooth unit 616 to the NFC unit 614.

At stage 630, the NFC unit 610 detects a near field touch when the initiating device 602 and the destination device 612 are within a threshold distance of each other. The NFC unit 610 transmits a near field touch event 632 which may include one or more touch parameters to the touch unit 606. As described above in FIG. 3, the touch parameters can include timing, direction, and/or pattern information associated with the near field touch between the initiating device 602 and the destination device 612. The touch unit 606 requests and receives connection parameters from the Bluetooth unit 616 of the destination device. The connection parameters can include an indication of the radios available on the destination device 612, a Bluetooth address associated with the destination device 612, etc. In one implementation, as depicted in FIG. 6, the Bluetooth unit 616 can provide the connection parameters associated with the destination device 612 in response to a request from the touch unit 606. In another implementation, however, the NFC unit 610 of the initiating device 602 can read (or automatically receive) the connection parameters associated with the destination device via the NFC unit 614 of the destination device 612 during the near field touch 630. The touch unit 606 of the initiating device 602 can establish a communication link between the initiating device 602 and the destination device 612. As described above in FIG. 3, the touch unit 606 transmits a touch request message 636 to the touch unit 618 and in response, receives a touch confirm message from the touch unit 618. The touch unit 606 and the touch unit 618 also exchange a touch exchange message 640 and a touch negotiate message 642. Because the initiating device 602 comprises data to transmit to the destination device 612, the touch unit 606 requests and receives a service list 644 from the Bluetooth unit 616. The touch unit 606 can determine (e.g., based on the context task, the context task parameters, and/or the service list associated with the destination device 612) whether the destination device 612 supports the services and protocols that may be utilized (e.g., by the initiating device 602) for executing the context task. In the example of FIG. 6, since the services and protocols are supported, the touch unit 606 transmits a confirm to send message 646 to the picture viewer application 604. The picture viewer application 604 initiates operations 648 for executing the context task. In this example, the picture viewer application 604 transmits the picture to the destination device 612. After the picture viewer application 604 completes the context task at stage 650, the picture viewer application 604 disconnects from the destination device 612 (or disables the communication link) at stage 652.

Figure 7:
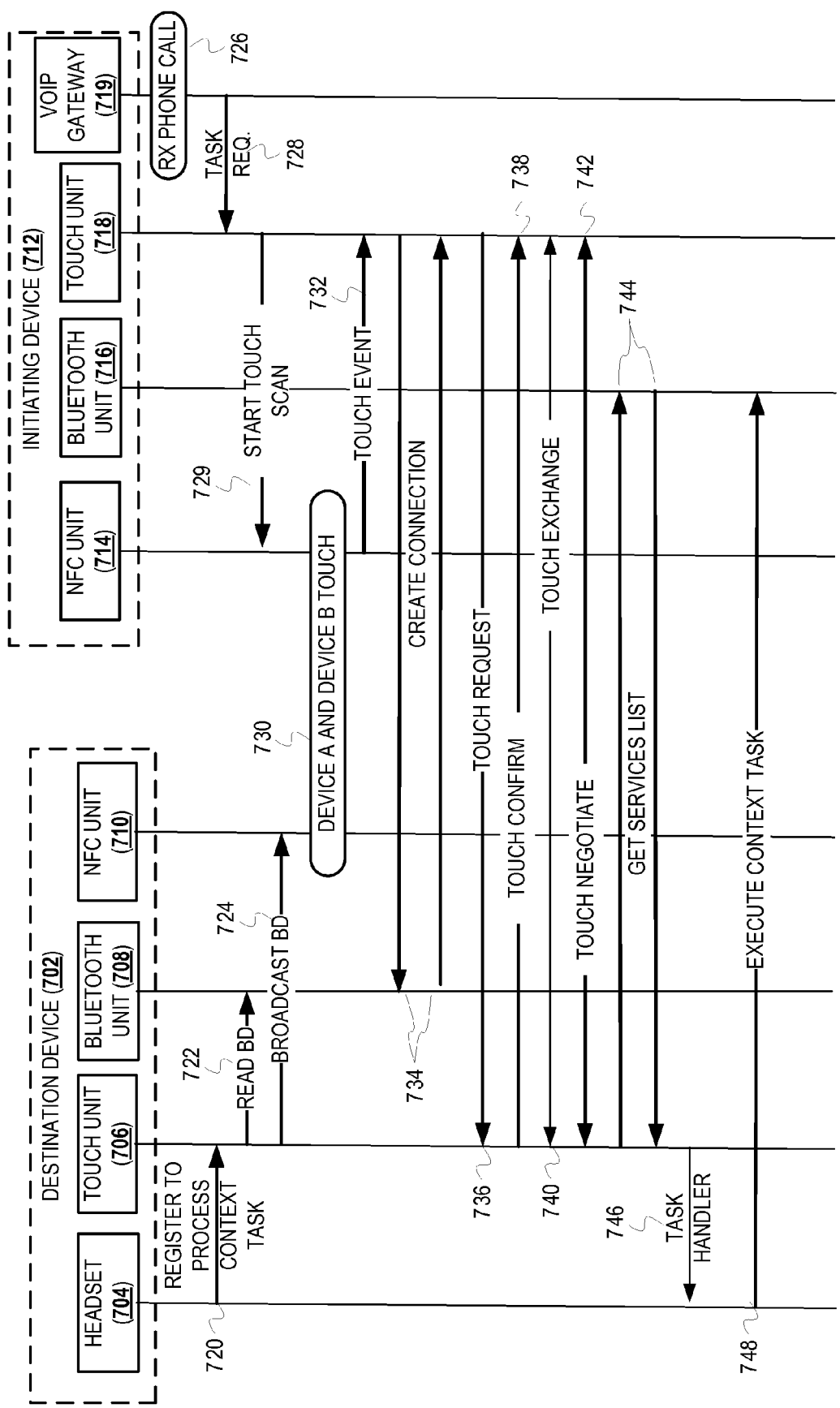
FIG. 7 is a sequence diagram illustrating example operations of an active service delivery mode associated with an initiating device that implements context awareness connection establishment.

FIG. 7 is a sequence diagram illustrating example operations of an active service delivery mode associated with an initiating device that implements context awareness connection establishment. FIG. 7 depicts an initiating device 712 and a destination device 702. The destination device 702 comprises a Bluetooth headset 704, a touch unit 706, a Bluetooth unit 708, and an NFC unit 710. The initiating device 712 comprises an NFC unit 714, a Bluetooth unit 716, a touch unit 718, and a VOIP gateway 719. In one example, the initiating device 712 can be a laptop computer comprising the VOIP gateway 719 and comprising functionality to make/receive VOIP phone calls. In this example, the destination device 702 comprises the Bluetooth headset 704 to allow for hands-free communication. In the active service delivery mode of FIG. 7, the computer (i.e., the initiating device 712) initializes and registers the hands-free profile audio gateway (HFP AG) service. Furthermore, in the active service delivery mode of FIG. 7, the initiating computer 712 can initiate the context task (e.g., a request for a connection with the Bluetooth headset for hands-free communication) when the VOIP gateway 619 detects a VOIP call (or in response to another suitable trigger such as a user request). In FIG. 7, the VOIP gateway 719 receives a VOIP phone call 726 (e.g., in response to a VOIP application making or receiving a VOIP phone call). In response to initializing the HFP AG service and receiving the VOIP phone call, the VOIP gateway 719 determines that the Bluetooth headset 704 should pick up the VOIP phone call. Accordingly, the VOIP gateway 719 transmits a start touch scan request 728 to the touch unit 718 to prompt initiation of the touch scan procedures. In some implementations, the context task request 728 can also identify the VOIP application, the context task associated with the VOIP application, etc. The touch unit 718 transmits a start touch scan request 729 prompting the NFC unit 714 to scan for the near field touch. At the destination device 702, the Bluetooth headset 704 registers to process one or more classes (or categories) of context tasks at stage 720. For example, the Bluetooth headset 704 can register to process context tasks associated with the HFP AG service in accordance with which the Bluetooth headset 704 enables hand-free communication. As described above, the touch unit 706 reads Bluetooth data (e.g., connection parameters) associated with the Bluetooth unit 708 at stage 722 and provides the connection parameters to the NFC unit 710 at stage 724.

At stage 730, the NFC unit 714 detects a near field touch when the initiating device 712 and the destination device 702 are within a threshold distance of each other. The NFC unit 714 transmits a near field touch event 732 including one or more touch parameters to the touch unit 718. At stage 734, the touch unit 718 requests and receives connection parameters from the Bluetooth unit 708 of the destination device 702. The initiating device 712 can establish a communication link with the destination device 702 based, at least in part, on the connection parameters associated with the destination device 702. As described above, the touch unit 718 can transmit a touch request message 736 to the touch unit 706, receive a touch confirm message 738 from the touch unit 706, and exchange a touch exchange message 740 and a touch negotiate message 742 with the touch unit 706. Because the destination device 702 will provide a service (e.g., the HFP AG) service to the initiating device 712, the touch unit 706 of the destination device 702 requests and receives a service list 744 from the Bluetooth unit 716 of the initiating device 712.

The touch unit 706 can browse the service list 744 associated with the initiating device 712, can determine whether the HFP AG service associated with the initiating device 712 has been initialized and activated (e.g., whether the Bluetooth headset 704 has registered to process context tasks associated with the HFP service). In the example of FIG. 7, the touch unit 706 determines that the HFP AG service has been initialized and triggers the Bluetooth headset 704 to execute the context task. For example, at stage 746, the touch unit 706 can trigger the context task handler associated with the Bluetooth headset 704 to complete the communication link between the Bluetooth headset 704 and the initiating device 712. The Bluetooth headset 704 initiates operations 748 for executing the context task. In this example, the Bluetooth headset 704 picks up the VOIP call (e.g., using the HFP service) enabling the user to communicate via the Bluetooth headset 704.

Figure 8:
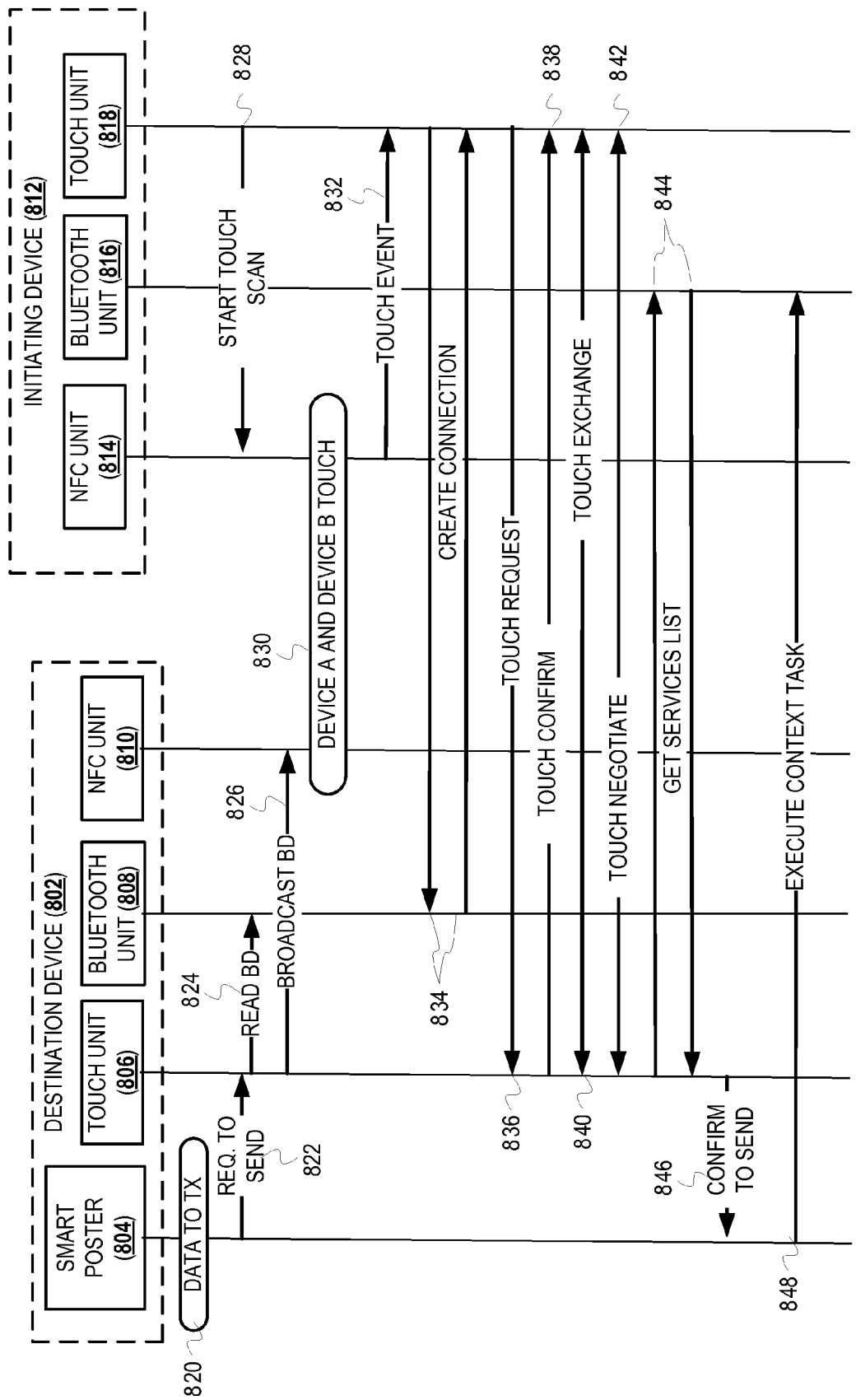
FIG. 8 is a sequence diagram illustrating example operations of a passive data delivery mode associated with an initiating device that implements context awareness connection establishment.

FIG. 8 is a sequence diagram illustrating example operations of a passive data delivery mode associated with an initiating device that implements context awareness connection establishment. FIG. 8 depicts an initiating device 812 and a destination device 802. The destination device 802 comprises a smart poster unit 804, a touch unit 806, a Bluetooth unit 808, and an NFC unit 810. The initiating device 812 comprises an NFC unit 814, a Bluetooth unit 816, and a touch unit 818. In one example, the smart poster unit 804 can be implemented as a poster, billboard, a three-dimensional object, etc. The smart poster unit 804 is typically associated with one or more NFC tags and each of the NFC tags can comprise predefined content. The smart poster unit 804 can provide the predefined content to a communication device (e.g., the initiating device 812) after a communication link between the smart poster unit 804 and the initiating device 812 is established, as will be further described below. In this example, the initiating device 812 can be a mobile phone or another suitable electronic device that establishes a communication link with the smart poster unit 804 to receive content from the smart poster unit 804.

In the passive data delivery mode of FIG. 8, the smart poster unit 804 determines (at stage 820) to transmit data to another communication device. The smart poster unit 804 transmits a request to send message 822 to the touch unit 806. Via the request to send message 822, the smart poster unit 804 may query the touch unit 806 regarding whether a communication link is established with another communication device and/or whether data can be transmitted to another communication device. In this example, the context task can comprise transmitting the data associated with the smart poster unit 804 to another communication device (e.g., the initiating device 812). As described above, the touch unit 806 reads Bluetooth data (e.g., connection parameters) associated with the Bluetooth unit 808 at stage 824 and provides the connection parameters to the NFC unit 810 at stage 824. It is noted that because the destination device 802 (comprising the smart poster unit 804) is a passive device, the NFC unit 810 may be implemented as one or more passive NFC tags. At the initiating device 812 (e.g., a mobile phone), the touch unit 818 transmits a start touch scan request (e.g., in response to determining to request data from the smart poster unit 804) prompting the NFC unit 814 to scan for the near field touch. A user can then move the initiating device 812 to within a threshold distance of the destination device 802.

At stage 830, the NFC unit 814 detects a near field touch when the initiating device 812 and the destination device 802 are within a threshold distance of each other. The NFC unit 814 transmits a near field touch event 832 including one or more touch parameters to the touch unit 818. At stage 834, the touch unit 818 requests and receives connection parameters from the Bluetooth unit 808 of the destination device 802. The initiating device 812 can establish a communication link with the destination device 802. The touch unit 818 can transmit a touch request message 836 to the touch unit 806, receive a touch confirm message 838 from the touch unit 806, and exchange a touch exchange message 840 and a touch negotiate message 842 with the touch unit 806. Because the destination device 802 comprises data (e.g., content associated with the smart poster unit 804) to be provided to the initiating device 812, the touch unit 806 requests and receives a service list 844 from the touch unit 818 of the initiating device 812 after the communication link is established. The touch unit 806 can browse the service list 844 associated with the initiating device 812, and determine whether the initiating device 802 comprises (and has enabled) protocols for receiving the content associated with the smart poster unit 804. In the example of FIG. 8, the touch unit 806 determines that the protocols associated with the context task (e.g., a data transfer protocol) are supported by the initiating device 712 and transmits a confirm to send message 846. The confirm to send message 846 triggers the smart poster unit 804 to process the pending context task and the smart poster unit 804 initiates operations 848 for executing the context task. In this example, the smart poster unit 804 can transmit the data (determined at stage 820) to the initiating device 812 (e.g., the mobile phone).

Figure 9:
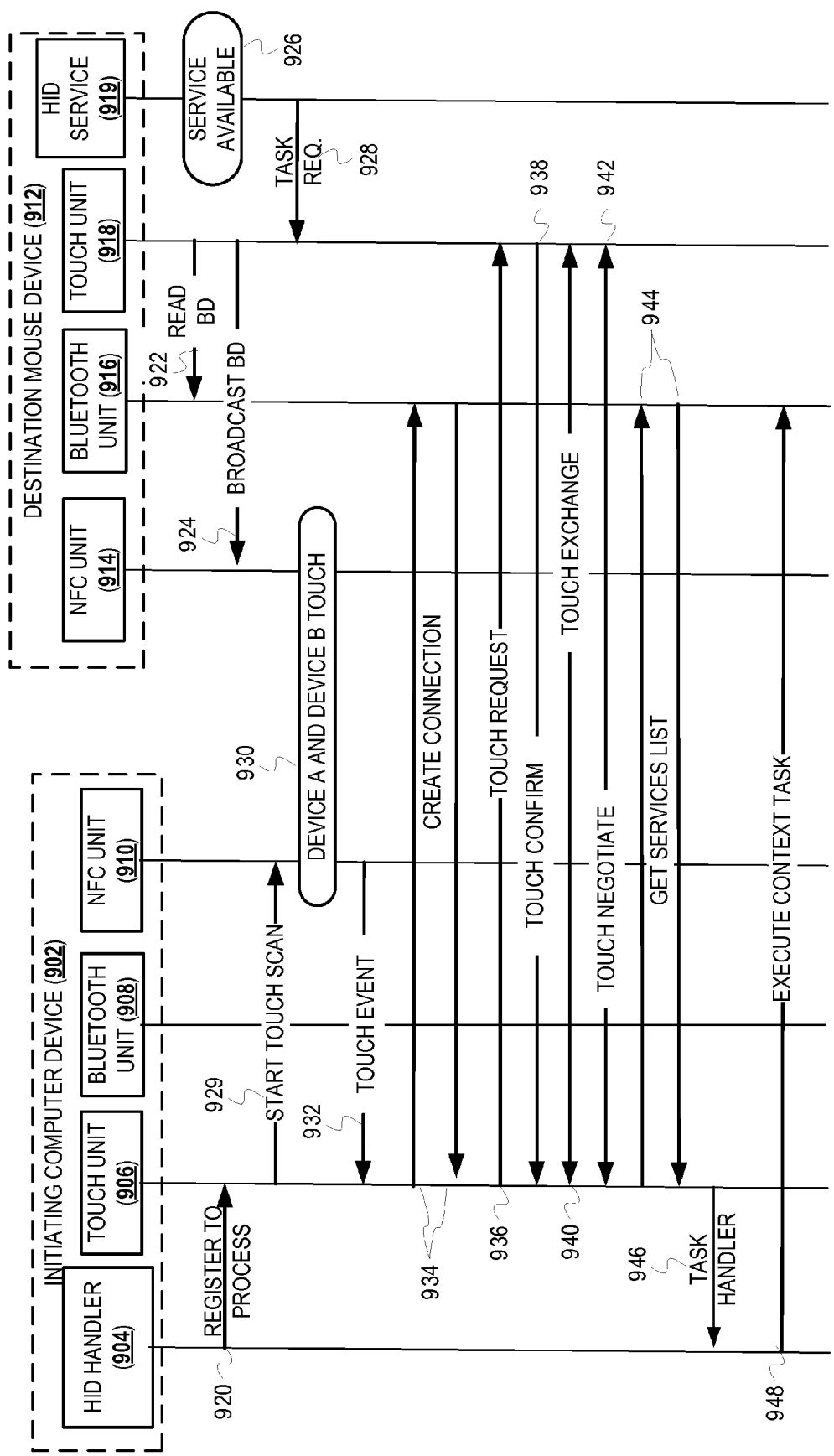
FIG. 9 is a sequence diagram illustrating example operations of a passive service delivery mode associated with an initiating device that implements context awareness connection establishment.

FIG. 9 is a sequence diagram illustrating example operations of a passive service delivery mode associated with an initiating device that implements context awareness connection establishment. FIG. 9 depicts an initiating device 902 and a destination device 912. The initiating device 902 comprises a human interface device profile (HID) handler 904, a touch unit 906, a Bluetooth unit 908, and an NFC unit 910. The destination device 912 comprises an NFC unit 914, a Bluetooth unit 916, a touch unit 918, and a HID service 919. In one example, the initiating device 902 can be a host computer while the destination device 912 can be a Bluetooth mouse. The context task associated with the initiating host computer 902 can comprise establishing a connection with the destination Bluetooth mouse 912. In the passive service delivery mode of FIG. 9, the HID handler 904 enables the HID profile and registers to process one or more classes/categories of context tasks at stage 920. For example, the HID handler 904 can register to process context tasks associated with the HID service. The touch unit 906 transmits a start touch scan request 929 prompting the NFC unit 910 to scan for the near field touch. At the destination device 912, the touch unit 918 reads Bluetooth data (e.g., connection parameters) associated with the Bluetooth unit 916 at stage 922 and transmits the Bluetooth data to the NFC unit 914 at stage 924. It is noted that in some implementations, the destination device 912 (i.e., the Bluetooth mouse) may be a passive device and consequently, the NFC unit 914 may be implemented as one or more passive NFC tags. Furthermore, the HID service 919 can also determine (at stage 926) and indicate (by transmitting a context task request 928) that the destination device 912 comprises an HID service (e.g., I/O capability provided by the destination mouse device 912).

At stage 930, the NFC unit 910 detects a near field touch when the initiating device 902 and the destination device 912 are within a threshold distance of each other. The NFC unit 910 transmits a near field touch event 932 including one or more touch parameters to the touch unit 906. At stage 934, the touch unit 906 requests and receives connection parameters from the Bluetooth unit 916 of the destination device 912. The initiating device 902 can establish a communication link with the destination device 912 based, at least in part, on the connection parameters associated with the destination device 912. As described above, the touch unit 906 can also transmit a touch request message 936 to the touch unit 918, receive a touch confirm message from the touch unit 918, and exchange a touch exchange message 940 and a touch negotiate message 942 with the touch unit 918. The touch unit 906 requests and receives a service list 944 from the Bluetooth unit 916. The touch unit 906 can browse the service list 944 associated with the destination device 912 and can determine whether the HID service 919 associated with the destination device 912 has been initialized and activated. If so, then at stage 946, the touch unit 906 triggers the context task handler (i.e., the HID handler 904) and the HID handler 904 initiates operations 948 for executing the context task. In this example, the HID handler 904 can connect the initiating computer device 902 to the destination mouse device 912 via the HID service.

It is noted that although FIGS. 6-9 depict the initiating device and the destination device exchanging the touch request, touch confirm, touch exchange, and touch negotiate messages, embodiments are not so limited. In other embodiments, the initiating device and the destination device may exchange only a subset of the touch request, touch confirm, touch exchange, and touch negotiate messages. For example, the initiating device may transmit the touch request message to the destination device and may receive the touch confirm message from the destination device (but may not transmit the touch exchange and the touch negotiate messages). It is noted that in other implementations, the initiating device and the destination device may not exchange any of the touch request, touch confirm, touch exchange, and touch negotiate messages.

It should be understood that FIGS. 1-9 are examples meant to aid in understanding embodiments and should not be used to limit embodiments or limit scope of the claims. Embodiments may comprise additional circuit components, different circuit components, and/or may perform additional operations, fewer operations, operations in a different order, operations in parallel, and some operations differently. In some implementations, a default service delivery model can be implemented if neither the initiating device 102 nor the destination device 110 indicates a context task to be executed. In this implementation, the initiating device 102 can analyze the services and functionality associated with the destination device 110. If it is determined that the destination device 110 provides only one service (e.g., if the destination device 110 is a Bluetooth headset that only comprises the ability to provide a hands-free communication service), the initiating device 102 can establish a communication link with the destination device 110 (and can determine the context task) in accordance with the service provided by the destination device 110. Alternately, if the destination device 110 provides more than one service, the touch parameters and/or the connection parameters can be used (as described above) to determine the type of communication link that should be established (and the context task that should be executed). For example, the duration for which the near field touch is maintained, and/or a pattern associated with the near field touch can correspond to a particular application and a particular context task. In other implementations, if the context task cannot be determined, the initiating device 102 can present a notification (e.g., a pop-up window) comprising a list of services and functionality provided by the destination device 110 and can prompt the user to select the context task to be executed.

In some implementations, the initiating device 102 or the destination device 110 (e.g., depending on the content delivery model) can execute more than one context task. For example, an initiating mobile phone 102 may determine to execute two context tasks. A first context task associated with a messaging application may comprise transmitting a message to a destination mobile phone 110, and a second context task associated with a picture viewing application may comprise transmitting a picture to the destination mobile phone 110. The initiating mobile phone 102 can initiate the touch scan procedures and can establish a communication link with the destination mobile phone 110 as described above. After the communication link is established, the application currently in the foreground may be designated as the highest priority application and the context task associated with the highest priority application may be executed. For example, if the picture viewing application is in the foreground, the second context task for transmitting the picture to the destination mobile phone 110 may be executed. Subsequently, the first context task for transmitting the message to the destination mobile phone 110 may be executed.

Furthermore, various techniques can be employed for exchanging connection parameters and the service list associated with the destination device 110 depending on whether the destination device 110 is an active device or a passive device. In one implementation, the initiating device 102 may be an active device comprising an NFC reader and the destination device 110 may be a passive device comprising an NFC tag. The initiating device 102 may initiate the procedures for establishing the communication link by transmitting a connection request (e.g., a request for connection parameters). The NFC tag associated with the destination device 110 can passively respond with the connection parameters (e.g., stored on the NFC tag). In some implementations, the NFC tag can comprise multiple sets of connection parameters each of which are associated with corresponding multiple applications/services. The initiating device 102 can receive the multiple sets of connection parameters, can select the appropriate set of connection parameters based on the context task, and can accordingly establish the communication link.

it is noted that although FIGS. 1-9 describe one of the communication devices (i.e., the initiating device 102) initiating the touch scan, generating the touch event, and establishing the communication link with the destination device 110, embodiments are not so limited. In other embodiments, both communication devices 102 and 110 may comprise functionality to initiate the touch scan procedures and to generate the touch event. For example, a first mobile phone and a second mobile phone may each comprise functionality to initiate the touch scan procedures and to generate the touch event. Each of the mobile phones may generate their respective context tasks (e.g., transmitting a picture to the other mobile phone). The first and the second mobile phones may initiate touch scan procedures, detect the near field touch, and establish the communication link. The first mobile phone can then transmit a touch exchange message to notify the second mobile phone of the context task associated with the first mobile phone. Likewise, the second mobile phone can transmit a touch exchange message to notify the first mobile phone of the context task associated with the second mobile phone. The first and the second mobile phones can then exchange touch negotiate messages to assign a priority to the two context tasks and to determine the order in which the context tasks will be executed (e.g., to determine which of the mobile phones will be the first to transmit its picture). In this example, where both the mobile phones comprise the functionality for initiating the touch scan procedures, the mobile phones can negotiate to assign the role of the initiating device and the role of the destination device.

In some implementations, a communication device may permit only one communication link to be established. For example, an initiating computer may initiate the touch scan procedure, may detect a near field touch with a destination Bluetooth headset, and may establish a communication link with the destination Bluetooth headset (a first destination device). The context task (e.g., picking up a VOIP call detected at the initiating computer) may be executed. While the communication link is established with the destination Bluetooth headset, the initiating computer may continue to execute the touch scan procedures. Subsequently, the initiating computer may detect a near field touch with a destination Bluetooth mouse (a second destination device). The initiating computer may disconnect from the destination Bluetooth headset and may establish a new communication link with the destination Bluetooth mouse to execute another context task. In some implementations, the context awareness unit 108 can enable the device detection unit 104 when a context task is detected. The context awareness unit 108 can disable the device detection unit 104 after the communication link with the destination device 110 is established or after the context task is executed. In some implementations, the context awareness unit 108 can use the current power mode of the initiating device 102 to determine whether to enable or disable the device detection unit 104. For example, the context awareness unit 108 can disable the device detection unit 104 to conserve power, if a display unit associated with the initiating device 102 switches off (or if the initiating device 102 switches to a low power mode).

Lastly, it is noted that in addition to the examples described above, depending on the protocols being implemented by the communication devices, the communication devices can be configured to implement other suitable functionality (e.g., to execute other suitable context tasks) in response to detecting the near field touch. For example, in response to detecting the near field touch, an initiating Bluetooth device can connect to a destination Bluetooth device or can switch from a first destination Bluetooth device to a second destination Bluetooth device if the Bluetooth devices implement the advanced audio distribution profile (A2DP), the human interface device profile (HID), etc. As another example, the in response to detecting the near field touch, the initiating Bluetooth device can transfer a file to or can initiate a synchronization procedure with the destination Bluetooth device if the Bluetooth devices implement a file transfer protocol (FTP) or a synchronization profile (SYNC) respectively.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 10:
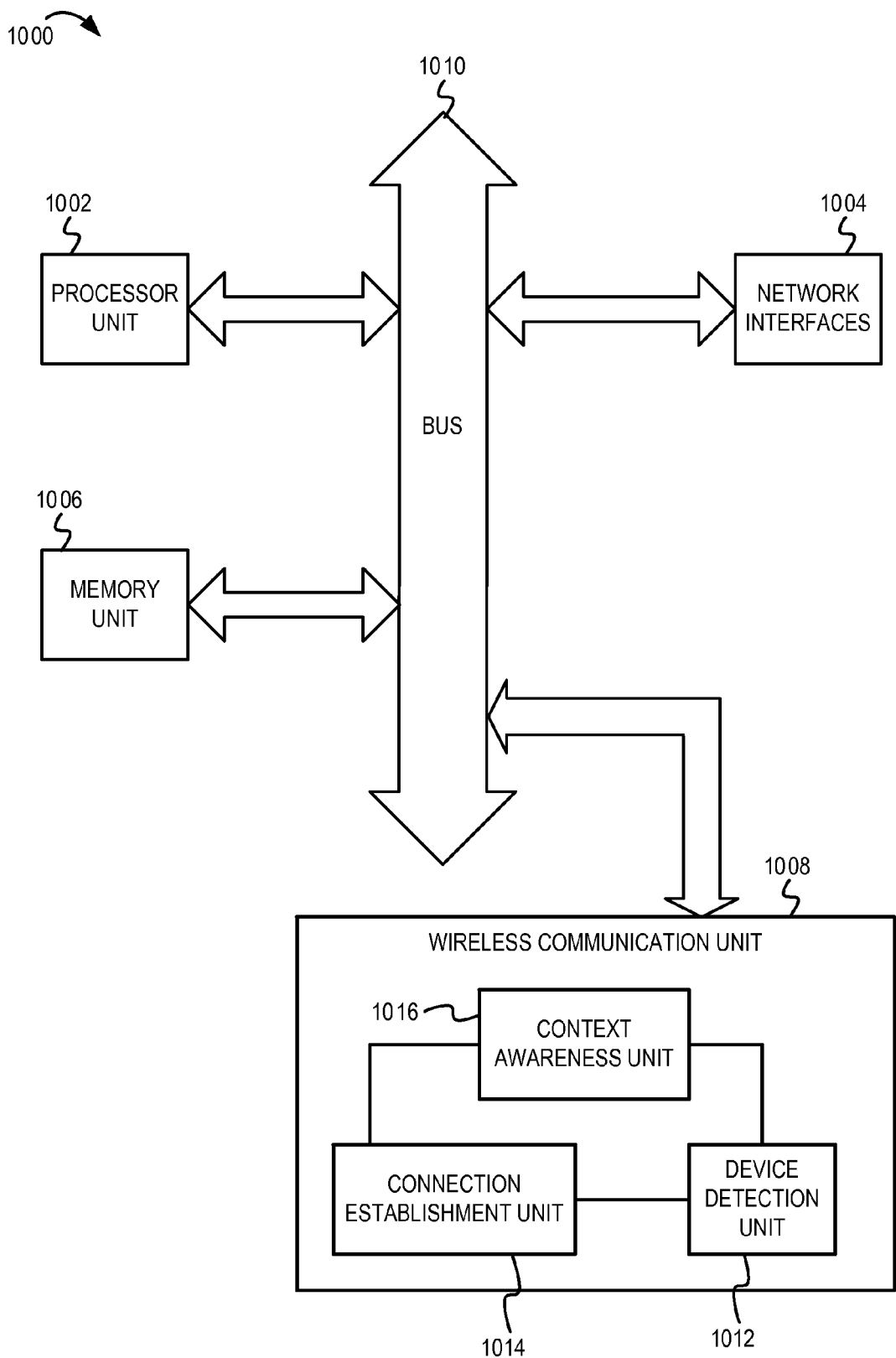
FIG. 10 is a block diagram of one embodiment of an electronic device including a context awareness proximity-based mechanism for establishing a communication link between communication devices.

FIG. 10 is a block diagram of one embodiment of an electronic device 1000 including a context awareness proximity-based mechanism for establishing a communication link between communication devices. In some implementations, the electronic device 1000 can be a dedicated wireless device, such as a Bluetooth device. In another implementation, the electronic device 1000 may be a laptop, a netbook, a mobile phone, a personal digital assistant (PDA), a tablet computer, a smart poster, a peripheral device (e.g., a Bluetooth mouse, a Bluetooth headset, etc.) or other suitable electronic system, with wireless communication capabilities. The electronic device 1000 includes a processor unit 1002 (possibly including multiple processors, multiple cores, multiple nodes, and/or implementing multi-threading, etc.). The electronic device 1000 includes a memory unit 1006. The memory unit 1006 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 1000 also includes a bus 1010 (e.g., PCI, ISA, PCI-Express, HyperTransport®, InfiniBand®, NuBus, AHB, AXI, etc.), and network interfaces 1004 that include one or more of a wireless network interface (e.g., a WLAN interface, a Bluetooth® interface, a WiMAX interface, a ZigBee® interface, a Wireless USB interface, etc.) and a wired network interface (e.g., an Ethernet interface, etc.).

The electronic device 1000 also includes a wireless communication unit 1008. The wireless communication unit 1008 comprises a device detection unit 1012, a connection establishment unit 1014, and a context awareness unit 1016. As described above in FIGS. 1-9, in some embodiments, the context awareness unit 1016 can initiate touch scan procedures in response to determining to exchange content with a destination device in accordance with a context task associated with an application. The device detection unit 1012 can generate a near field touch event in response to detecting that the destination device and the electronic device 1000 are within a predetermined threshold distance of each other. The connection establishment unit 1014 can establish a communication link with the destination device. The context task can then be executed.

Any one of the above-described functionalities may be partially (or entirely) implemented in hardware and/or on the processor unit 1002. For example, the functionality may be implemented with an application specific integrated circuit, in logic implemented in the processor unit 1002, in a co-processor on a peripheral device or card, etc. Further, realizations may include fewer or additional components not illustrated in FIG. 10 (e.g., video cards, audio cards, additional network interfaces, peripheral devices, etc.). The processor unit 1002, the memory unit 1006, and the network interfaces 1006 are coupled to the bus 1010. Although illustrated as being coupled to the bus 1010, the memory unit 1006 may be coupled to the processor unit 1002.

While the embodiments are described with reference to various implementations and exploitations, it will be understood that these embodiments are illustrative and that the scope of the inventive subject matter is not limited to them. In general, a near field touch based mechanism for establishment of wireless communication connection as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    determining, at a first communication device, to execute a context task associated with an application associated with the first communication device;
    determining whether a second communication device is within a threshold detection distance from the first communication device in response to determining to execute the context task;
    establishing a communication link with the second communication device based, at least in part, on a detection parameter and a connection parameter associated with the second communication device in response to determining that the second communication device is within the threshold detection distance from the first communication device, wherein the detection parameter comprises at least one of an indication of a time period for which the second communication device was within the threshold detection distance of the first communication device, a tag associated with the first communication device, and a pattern in accordance with which the second communication device was within the threshold detection distance;
    determining whether to execute the context task based, at least in part, on a service list associated with the second communication device and the context task; and
    executing the context task via the communication link between the first communication device and the second communication device in response to determining to execute the context task.

2. The method of claim 1, further comprising:
    identifying the context task based, at least in part, on the application associated with the first communication device; and
    determining parameters associated with the context task that comprise at least one of an identifier of the application associated with the context task, an identifier associated with the context task, a preferred communication channel for executing the context task, and a preferred communication protocol for executing the context task.

3. The method of claim 1, wherein said determining that the second communication device is within the threshold detection distance of the first communication device comprises:
    receiving, at the first communication device, a notification signal from a sensor associated with the first communication device indicating that the second communication device is within the threshold detection distance of the first communication device, or
    determining that the second communication device is within the threshold detection distance of the first communication device based on executing near field communication (NFC) techniques at the first communication device.

4. The method of claim 1, further comprising:
    generating a detection notification message to indicate that the second communication device is within the threshold detection distance of the first communication device.

5. The method of claim 1, wherein the connection parameter comprises at least one of an indication of a radio unit associated with the second communication device, an indication of whether the radio unit is enabled, an indication of a communication protocol associated with the second communication device, and an indication of an identifier associated with the second communication device.

6. The method of claim 1, further comprising at least one of:
    transmitting a request message to the second communication device to indicate that the communication link between the first communication device and the second communication device is established;

receiving, from the second communication device, a confirm message that acknowledges receipt of the request message at the second communication device; and transmitting an exchange message that identifies the context task.

7. The method of claim 1, further comprising:

determining, at the first communication device, to execute a plurality of context tasks associated with one or more applications associated with the first communication device, wherein the plurality of context tasks comprise the context task; and determining a priority associated with one or more of the plurality of context tasks to determine a sequence in which to execute the plurality of context tasks.

8. The method of claim 1, further comprising:

receiving, at the first communication device, the service list.

9. The method of claim 1, further comprising:

determining a context task execution parameter associated with said executing the context task based, at least in part, on the context task and the application associated with the context task, wherein the context task execution parameter comprises at least one of a communication protocol and a service associated with the context task; and determining whether the second communication device supports the context task execution parameter based, at least in part, on the service list.

10. The method of claim 1, wherein the first communication device and the second communication device implement a Bluetooth protocol.

11. A method comprising:

providing, from a second communication device to a first communication device, a connection parameter associated with the second communication device;

determining that a communication link is established between the first communication device and the second communication device based, at least in part, on the connection parameter;

determining whether the second communication device comprises data or services to be provided to the first communication device for executing a context task associated with an application associated with the first communication device based, at least in part, on the context task;

determining whether to execute the context task based, at least in part, on a service list associated with the first communication device and the context task in response to determining that the second communication device comprises data or services to be provided to the first communication device for executing the context task; and executing the context task via the communication link between the first communication device and the second communication device in response to determining to execute the context task.

12. The method of claim 11, wherein said providing the connection parameter is in response to:

receiving, from the first communication device, a request for the connection parameter, or determining that the first communication device is within a threshold detection distance from the second communication device.

13. The method of claim 11, wherein the method further comprises:

in response to determining that the first communication device comprises data or services to be provided to the second communication device for executing the context task, providing a service list associated with the second communication device to the first communication device.

14. The method of claim 11, wherein said determining whether to execute the context task comprises:

determining a context task execution parameter associated with said executing the context task based on at least one of the context task, and the data or services to be provided to the first communication device, wherein the context task execution parameter comprises at least one of a communication protocol associated with the context task and communication services associated with the context task; and determining whether the first communication device supports the context task execution parameter based, at least in part, on the service list; and wherein said executing the context task comprises:

providing the data or the services to the first communication device in accordance with the context task.

15. A communication device comprising:

a context awareness unit operable to:

determine to execute a context task associated with an application associated with the communication device;

a device detection unit operable to:

determine whether a second communication device is within a threshold detection distance from the communication device in response to the context awareness unit determining to execute the context task;

a connection establishment unit operable to:

establish a communication link with the second communication device based, at least in part, on a detection parameter and a connection parameter associated with the second communication device in response to the device detection unit determining that the second communication device is within the threshold detection distance from the communication device, wherein the detection parameter comprises at least one of an indicator of a time period for which the second communication device was within the threshold detection distance of the communication device, a tag associated with the communication device, and a pattern in accordance with which the second communication device was within the threshold detection distance;

the context awareness unit further operable to:

determine whether to execute the context task based, at least in part, on a service list associated with the second communication device and the context task; and cause the context task to be executed via the communication link between the communication device and the second communication device in response to the context awareness unit determining to execute the context task.

16. The communication device of claim 15, wherein the context awareness unit is further operable to:

identify the context task based, at least in part, on the application; and determine parameters associated with the context task that comprise at least one of an identifier of the application, an identifier associated with the context task, a preferred communication channel for executing the context task, and a preferred communication protocol for executing the context task.

17. The communication device of claim 15, wherein the device detection unit is further operable to:
receive a notification signal from a sensor associated with the communication device indicating that the second communication device is within the threshold detection distance of the communication device, or
determine that the second communication device is within the threshold detection distance of the communication device based on executing near field communication (NFC) techniques at the communication device.

18. The communication device of claim 15,
wherein the device detection unit is further operable to:
generate a detection notification message to indicate that the second communication device is within the threshold detection distance of the communication device.

19. The communication device of claim 15, wherein the connection parameter comprises at least one of an indication of a radio unit associated with the second communication device, an indication of whether the radio unit is enabled, an indication of a communication protocol associated with the second communication device, and an indication of an identifier associated with the second communication device.

20. The communication device of claim 15, wherein the connection establishment unit is configured to perform at least one of:
transmit a request message to the second communication device to indicate that the communication link between the communication device and the second communication device is established;
receive, from the second communication device, a confirm message that acknowledges receipt of the request message at the second communication device; and
transmit an exchange message that identifies the context task.

21. The communication device of claim 15, wherein the context awareness unit is further operable to:
determine to execute a plurality of context tasks associated with one or more applications associated with the communication device, wherein the plurality of context tasks comprise the context task; and
determine a priority associated with one or more of the plurality of context tasks to determine a sequence in which to execute the plurality of context tasks.

22. A non-transitory machine-readable storage medium having instructions stored therein, which when executed by a processor causes the processor to perform operations that comprise:
determining to execute a context task associated with an application associated with a first communication device;
determining whether a second communication device is within a threshold detection distance from the first communication device in response to said operation of determining to execute the context task;
establishing a communication link with the second communication device based, at least in part, on a detection parameter and a connection parameter associated with the second communication device in response to determining that the second communication device is within the threshold detection distance from the first communication device, wherein the detection parameter comprises at least one of an indicator of a time period for which the second communication device was within the threshold detection distance of the first communication device, a tag associated with the first communication device, and a pattern in accordance with which the second communication device was within the threshold detection distance;
determining whether to execute the context task based, at least in part, on a service list associated with the second communication device and the context task; and
executing the context task via the communication link between the first communication device and the second communication device in response to determining to execute the context task.

23. The non-transitory machine-readable storage medium of claim 22, wherein the operations further comprise:
identifying the context task based, at least in part, on the application; and
determining parameters associated with the context task that comprise at least one of an identifier of the application, an identifier associated with the context task, a preferred communication channel for executing the context task, and a preferred communication protocol for executing the context task.

24. The non-transitory machine-readable storage medium of claim 22, wherein the operations further comprise:
generating a detection notification message to indicate that the second communication device is within the threshold detection distance of the first communication device.

25. The non-transitory machine-readable storage medium of claim 22, wherein the operations further comprise:
determining a context task execution parameter associated with executing the context task based, at least in part, on the context task and the application associated with the context task, wherein the context task execution parameter comprises at least one of a communication protocol and a service associated with the context task; and
determining whether the second communication device supports the context task execution parameter based, at least in part, on the service list.

* * * * *